US009723490B2

(12) United States Patent
Wang et al.

(10) Patent No.: US 9,723,490 B2
(45) Date of Patent: Aug. 1, 2017

(54) ACKNOWLEDGEMENT COMMUNICATION WITH INTERFERENCE DETECTION (ACK-ID)

(71) Applicant: UNIVERSITY OF OTTAWA, OTTAWA (CA)

(72) Inventors: Zhipeng Wang, Ottawa (CA); Tianyu Du, Ottawa (CA); Dimitrios Makrakis, Ottawa (CA); Hussein T. Mouftah, Ottawa (CA)

(73) Assignee: UNIVERSITY OF OTTAWA, Ottawa (CA)

( * ) Notice: Subject to any disclaimer, the term of this patent is extended or adjusted under 35 U.S.C. 154(b) by 275 days.

(21) Appl. No.: 14/335,580

(22) Filed: Jul. 18, 2014

(65) Prior Publication Data

US 2015/0117333 A1 Apr. 30, 2015

Related U.S. Application Data

(60) Provisional application No. 61/895,956, filed on Oct. 25, 2013.

(51) Int. Cl.
*H04W 16/14* (2009.01)
*H04L 1/18* (2006.01)
(52) U.S. Cl.
CPC .............. *H04W 16/14* (2013.01); *H04L 1/18* (2013.01)
(58) Field of Classification Search
None
See application file for complete search history.

(56) References Cited

U.S. PATENT DOCUMENTS

| 2002/0141375 A1* | 10/2002 | Choi ..................... H04W 16/14 370/347 |
| 2003/0016142 A1* | 1/2003 | Holmes .................. H04Q 9/02 340/870.11 |
| 2003/0039214 A1* | 2/2003 | Huffman ............... H04W 24/00 370/252 |
| 2003/0133422 A1* | 7/2003 | Bims ........................ H04L 1/16 370/328 |
| 2004/0064281 A1* | 4/2004 | Kim ..................... H04B 17/318 702/107 |
| 2004/0156399 A1* | 8/2004 | Eran .................. H04J 13/0048 370/395.5 |
| 2006/0040707 A1* | 2/2006 | Kish ..................... H04B 7/061 455/562.1 |
| 2006/0067226 A1* | 3/2006 | Chandra ............... H04W 24/00 370/235 |
| 2006/0171357 A1* | 8/2006 | King ................... H04W 72/046 370/331 |

(Continued)

OTHER PUBLICATIONS

Almeida, R. B. et al., "On the evolution of Wikipedia," In International Conference on Weblogs and Social Media, ICWSM, pp. 8 (2007).

(Continued)

*Primary Examiner* — Jenee Williams
(74) *Attorney, Agent, or Firm* — Maschoff Brennan

(57) ABSTRACT

In some examples, a method may include determining whether a data packet is correctly received. In response to the data packet being correctly received, the method may include reading a received signal strength indication (RSSI) value, and based on the RSSI value, determining whether to transmit an acknowledgement (ACK) packet.

28 Claims, 10 Drawing Sheets

(56) References Cited

U.S. PATENT DOCUMENTS

| | | | |
|---|---|---|---|
| 2006/0172711 A1* | 8/2006 | King | H04B 7/061 455/101 |
| 2007/0177540 A1* | 8/2007 | Rue | H04W 74/02 370/328 |
| 2007/0218841 A1* | 9/2007 | Wright | H04B 1/1027 455/63.3 |
| 2007/0291688 A1* | 12/2007 | Jiang | H04L 1/1812 370/328 |
| 2008/0001735 A1* | 1/2008 | Tran | G06F 19/3418 340/539.22 |
| 2008/0266081 A1* | 10/2008 | D'Agostino | G08B 25/10 340/539.21 |
| 2009/0168677 A1* | 7/2009 | Kang | H04W 52/08 370/311 |
| 2011/0086661 A1* | 4/2011 | Yamamoto | H04L 1/1893 455/513 |
| 2011/0105025 A1* | 5/2011 | Wang | H04L 1/0019 455/41.2 |
| 2012/0109399 A1* | 5/2012 | Tran | H02J 3/14 700/296 |
| 2012/0115523 A1* | 5/2012 | Shpak | H04B 7/024 455/507 |
| 2012/0159074 A1 | 6/2012 | Sodhi et al. | |
| 2013/0315093 A1* | 11/2013 | Jiang | H04B 17/382 370/252 |

OTHER PUBLICATIONS

Amdahl, G.M., "Validity of the Single Processor Approach to Achieving Large-Scale Computing Capabilities," Spring Joint Computer Conference, AFIPS, Apr. 18-20, 1967, pp. 483-485.

Barroso, L. A. and Holzle, U., "The Case for Energy-Proportional Computing," Computer, vol. 40, No. 12, pp. 33-37 (2007).

Carlson, T.E., et al., "Sniper: Exploring the Level of Abstraction for Scalable and Accurate Parallel Multi-Core Simulation," 2011 International Conference for High Performance Computing, Networking, Storage and Analysis (SC), pp. 1-12, (2011).

Chen, Y. et al., "The Case for Evaluating Mapreduce Performance Using Workload Suites," In Proceedings of the 2011 IEEE 19th Annual International Symposium on Modelling, Analysis, and Simulation of Computer and Telecommunication Systems, MASCOTS '11, pp. 390-399 (2011).

Esmaeilzadeh, H. et al., "Dark Silicon and The End of Multicore Scaling," Proceedings of the 38th annual international symposium on Computer architecture, pp. 365-376 (2011).

Falsafi, B., "VISA: Vertically Integrated Server Architecture," Accessed at http://web.archive.org/web120130312033001/http://parsa.epfl.ch/visa/, Accessed on Jun. 23, 2014, pages.

Feng, H. et al., "Optimal State-Free, Size-aware Dispatching for Heterogeneous M/G/-type systems," 24th International Symposium on Computer Performance, Modeling, Measurements and Evaluation, vol. 62, No. 1-4, pp. Apr. 2005.

Hardavellas, N. et al., "Toward Dark Silicon in Servers," Micro, IEEE, vol. 31, No. 4, pp. 6-15 (2011).

Kumar, R. et al., "Single-Isa Heterogeneous Multi-Core Architectures for Multithreaded Workload Performance," In ACM SIGARCH Computer Architecture News, IEEE Computer Society, vol. 32, No. 2, pp. 64-75 (2004).

Li, J. and Martinez, J. F., "Dynamic Power-Performance Adaptation of Parallel Computation on Chip Multiprocessors," The Twelfth International Symposium on High-Performance Computer Architecture, pp. 77-87, (2006).

Li, S. et al., "An Integrated Power, Area, and Timing Modeling Framework for Multicore and Manycore Architectures," 42nd Annual IEEE/ACM International Symposium on Microarchitecture, 2009, MICRO-42, pp. 469-480 (2009).

Lotfi-Kamran, P. et al., "Scale-out processors," In Proceedings of the 39th Annual International Symposium on Computer Architecture, ISCA '12, pp. 500-511 (2012).

Rahm, E., "Dynamic Load Balancing in Parallel Database Systems," In Euro-Par'96 Parallel Processing, pp. 37-52 (1996).

Raman, A. et al., "Parallelism Orchestration Using Dope: The Degree of Parallelism Executive," in ACM SIGPLAN Notices, vol. 46, pp. 26-37 (2011).

Ramaswamy, S. and Yalamanchili, S., "Improving Cache Efficiency Via Resizing+ Remapping," 25th International Conference on Computer Design, 2007, ICCD, pp. 47-54 (2007).

Shelepov, D. et al., "Hass: A Scheduler for Heterogeneous Multicore Systems," ACM SIGOPS Operating Systems Review, vol. 43, No. 2, pp. 66-75 (2009).

Venkatesh, G. et al., "Conservation Cores: Reducing The Energy of Mature Computations," in ASPLOS 2010: Architectural Support for Programming Languages and Operating Systems, pp. 14 (2010).

Woo, S. C. et al., "The Splash-2 Programs: Characterization and Methodological Considerations," In Proceedings of the 22nd annual international symposium on Computer architecture, ISCA '95, pp. 24-36 (1995).

Zhang, Z. and Daigle, J. "Analysis of job assignment with batch arrivals among heterogeneous servers," European Journal of Operational Research, vol. 217, No. 1, pp. 149-161 (2012).

Shin, S.Y. et al. "Mutual interference analysis of IEEE 802.15.4 and IEEE 802.11b". Computer Networks 51 (2007) 3338-3353. www.sciencedirect.com. Elsevier B.V.

"2.4 GHz IEEE 802.15.4 / ZigBee-ready RF Transceiver," Texas Instruments, Accessed on Feb. 29, 2016, pp. 96.

"Information technology—Telecommunications and information exchange between systems—Local and metropolitan area networks—Specific requiremetns—Part 15.4: Wireless Medium Access Control Not Yet Cited (MAC) and Physical Layer (PHY) Specifications for Low-Rate Wireless Personal Area Networks (WPANs)," Accessed at http://web.archive.org/web/20131009051239/http://standards.ieee.org/findstds/standard/802.15.4-2006.html, Accessed on Feb. 29, 2016, pp. 2 (2006).

Angrisani, L. et al., "Experimental Study of Coexistence Issues Between IEEE 802.11b and IEEE 802.15.4 Wireless Networks," IEEE Trans. Instrumentation and Measurement, vol. 57, No. 8, pp. 1514-1523 (Aug. 2008).

Chong, J. W. et al., "Analysis of throughput in a ZigBee network under the presence of WLAN interference," International Symposium on Communication and Information Technologies (ISCIT'07), pp. 1166-1170 (Oct. 17-19, 2007).

Dainotti, A. et al., "A tool for the generation of realistic network workload for emerging networking scenarios," Computer Networks (Elsevier), vol. 56, No. 15, pp. 3531-3547 (Oct. 15, 2012).

Francesco, M. D. et al., "An adaptive algorithm for dynamic tuning of MAC parameters in IEEE 802.15.4/ZigBee sensor networks," 8th IEEE International Conference on Pervasive Computing and Communications Workshops (PERCOM Workshops), pp. 400-405, (2010).

Ha, J. Y. et al., "An Enhanced CSMA-CA Algorithm for IEEE 802.15.4 LR-WPANs," IEEE Communications Letters, vol. 11, Issue 5, pp. 461-463 (May 2007).

Huang, M. L. and Park, S.-C., "A WLAN and ZigBee coexistence mechanism for wearable health monitoring system," 9th International Symposium on Communications and Information Technology, ISCIT 2009, pp. 555-559 (2009).

Jung, B. H. et al., "Interference mediation for coexistence of WLAN and ZigBee netwokrs," IEEE 19th International Symposium on Personal, Indoor and Mobile Radio Communciations PIMRC 2008, pp. 1-5 (2008).

Kiryushin, A. et al., "Real-world performance of clear channel assessment in 802.15.4 wireless sensor networks," Second International Conference on Sensor Technologies and Applications, pp. 625-630 (Aug. 2008).

Liang, C-J. M. et al., "Surviving Wi-Fi Interference in Low Power ZigBee Networks," SenSys'10, pp. 309-322 (Nov. 3-5, 2010).

Nakatsuka, K. et al., "A Proposal of the Co-existence MAC of IEEE 802.11b/g and 802.15.4 used for The Wireless Sensor Network," 5th IEEE Conference on Sensors, pp. 722-725 (Oct. 22-25, 2006).

Petrova, M. et al., "Interference Measurements on Performance Degradation between Colocated IEEE 802.11g/n and IEEE 802.15.4

(56) References Cited

OTHER PUBLICATIONS

Networks," Sixth International Conference on Networking, 2007 (ICN'07), pp. 93-98 (Apr. 22-28, 2007).

Ramchandran, I. and Roy, S. "On the Impact of Clear Channel Assessment on MAC Performance," IEEE GLOBECOM'06, Nov. 2006, pp. 1-5.

Shin, S. Y. et al., "Packet Error Rate Analysis of ZigBee Under WLN and Bluetooth Interferences," IEEE Trans. Commun., vol. 6, Issue 8, pp. 2825-2830 (Aug. 2007).

Tang, Y. et al., "Interference aware adaptive clear channel assessment for improving ZigBee packet transmission under Wi-Fi Interference," submitted to the 10th annual IEEE Communications Society Conference on Sensor, Mesh and Ad Hoc Communications and Networks (SECON), 2013, pp. 336-343 (Jun. 24-27, 2013).

Tang, Y. et al., "Study of clear channel assessment mechanism for ZigBee packet transmission under Wi-Fi Interference," IEEE 10th Consumer Communications and Networking Conference (CCNC'13), pp. 765-768 (Jan. 11-14, 2013).

Wang, Z. et al., "ACK with Interference Detection Technique for ZigBee Network under Wi-Fi Interference," Eighth International Conference on Broadband and Wireless Computing, Communication and Applications (BWCCA), pp. 128-135 (Oct. 28-30, 2013).

Wong, C.-M., and Hsu, W.-P., "An additional clear channel assessment for IEEE 802.15.4 slotted CSMA/CA networks," IEEE International Conference on Communication Systems (ICCS), pp. 62-66 (Nov. 17-19, 2010).

Xu, R. "MuZi: Multi-channel ZigBee Networks for Avoiding WiFi Interference," 2011 International Conference on and 4th International Conference on Cyber, Physical and Social Computing Internet of Things (iThings/CPSCom), pp. 323-329 (Oct. 19-22, 2011).

Yi, P., et al., "Frequency agility in a ZigBee networks for smart grid application," IEEE Innovative Smart Grid Technologies (ISGT), pp. 1-6 (Jan. 19-21, 2010).

Yi, P., et al., "Frequency agility in a ZigBee network for smart grid application," IEEE Innovative Smart Grid Technologies (ISGT), pp. 1-18 (Jan. 20, 2010).

Yi, P. et al., "Developing ZigBee Deployment Guideline Under WiFi Interference for Smart Grid Applications," IEEE Trans. Smart Grid, vol. 2, Issue 1, pp. 110-120 (Mar. 2011).

Yuan, W. et al., "A Coexistence Model of IEEE 802.15.4 and IEEE 802.11b/g," 14th IEEE Symposium on communications and Vehicular Technology in the Benelux, pp. 1-5 (Nov. 15, 2007).

Yuan, W. et al., "Adaptive CCA for IEEE 802.15.4 Wireless Sensor Networks to Mitigate Interference," IEEE Wireless communications and Networking Conference (WCNC), pp. 1-5 (Apr. 18-21, 2010).

Zeghdoud, M. et al., "Impact of Clear Channel Assessment Mode on the Performance of ZigBee Operating in a WiFi Environment," 1st Workshop on Operator-Assisted (Wireless Mesh) Community Networks, pp. 1-8 (Sep. 2006).

\* cited by examiner

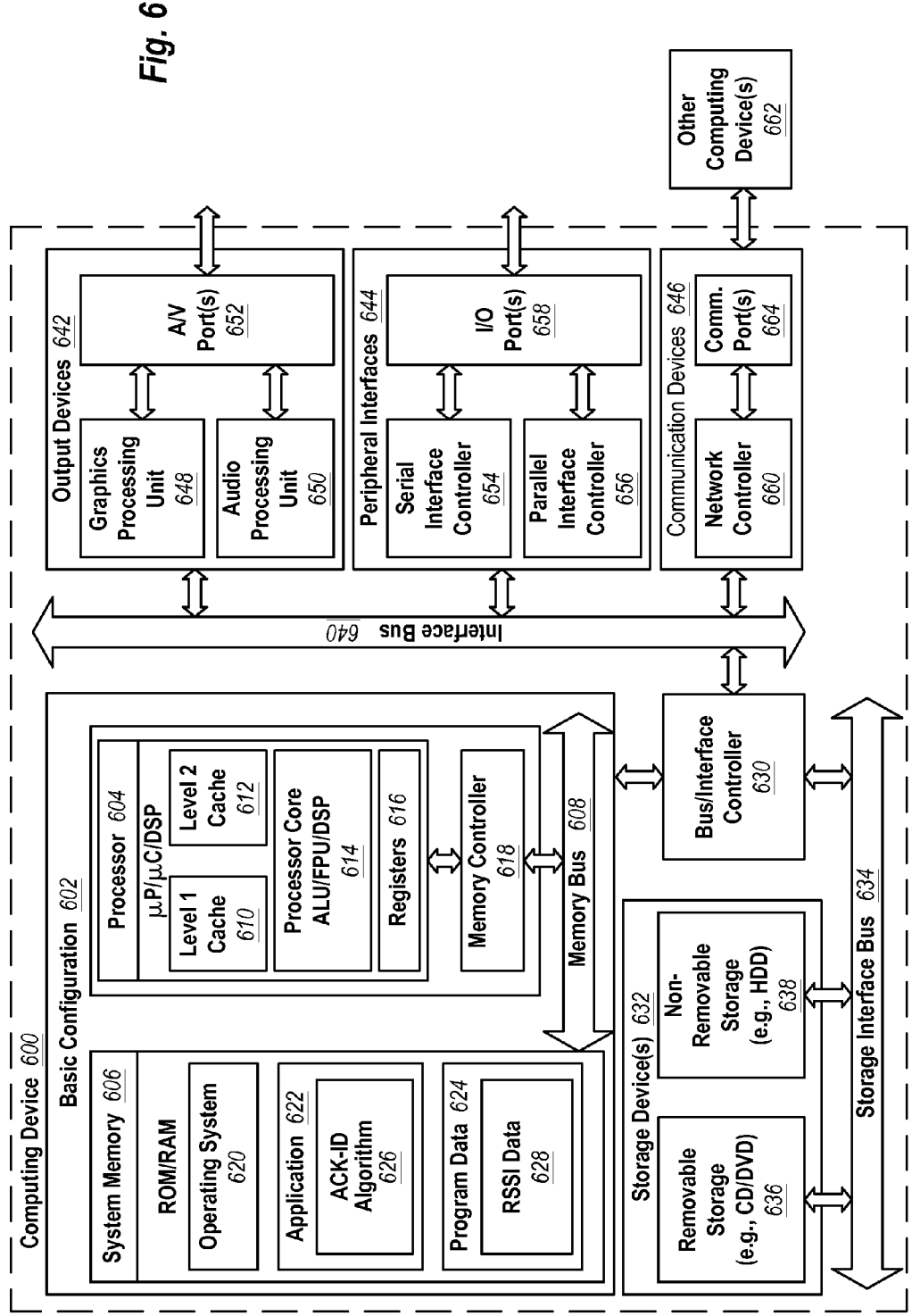

ACKNOWLEDGEMENT COMMUNICATION WITH INTERFERENCE DETECTION (ACK-ID)

CROSS REFERENCE TO RELATED APPLICATION APPLICATIONS

This application claims, under 35 U.S.C. §119(e), priority to and the benefit of U.S. Provisional Patent Application No. 61/895,956, filed on Oct. 25, 2013, which is incorporated herein by reference in its entirety.

BACKGROUND

Unless otherwise indicated herein, the materials described herein are not prior art to the claims in the present application and are not admitted to be prior art by inclusion in this section.

ZigBee is an example of a low-cost, low-power, wireless mesh networking standard. The low cost may make the technology widely used in control and monitoring applications. The low power usage may allow longer life with smaller batteries, while the mesh networking may provide high reliability and larger range. ZigBee devices, which are sometimes referred to as ZigBee motes, may operate at about a 2.4 gigahertz (GHz) band (2400-2483.5 MHz), known worldwide as Industrial, Scientific, and Medical (ISM) unlicensed band. However, the 2.4 GHz band may also be used by many unlicensed products, such as IEEE 802.11b/g/n wireless local area networks (WLAN) and Bluetooth wireless personal area networks (WPAN) or other wireless networks, including wireless fidelity (Wi-Fi) networks. There are signs of growing interference problems between networks such as ZigBee networks and WLANs. The expectation is that the interference problems may worsen. Among all interferers, a WLAN can cause a severe interference problem for ZigBee networks due to the considerably higher transmission power that the WLAN may use and the pervasive deployment of Wi-Fi devices.

SUMMARY

Techniques described herein generally relate to acknowledgement communication with interference detection (ACK-ID).

In some examples, a method may include determining whether a data packet is correctly received. In response to the data packet being correctly received, the method may include reading a received signal strength indication (RSSI) value, and based on the RSSI value, determining whether to transmit an acknowledgement (ACK) packet.

In some examples, a node of a first network. The first network may be configurable to operate within a proximity of a second network that communicates traffic that could interfere with data communication in the first network. The node may include a processor and a module. The module may be operatively coupled to the processor and responsive to the processor to perform ACK-ID. The first module may be configured to determine whether a data packet is correctly received. The first module may be configured to, in response to a determination that the data packet is correctly received: read a RSSI value, and based on the RSSI value, determine whether to transmit an ACK packet.

In some examples, a non-transitory computer-readable medium that may include computer-readable instructions stored thereon, which in response to execution by a processor, cause the processor to perform or cause the processor to control performance of a method. The method may include determining whether a data packet is correctly received. In response to the data packet being correctly received, the method may include reading a RSSI value, and based on the RSSI value, determining whether to transmit an ACK packet.

In some examples, a method may include determining whether a data packet is correctly received. In response to the data packet being incorrectly received, the method may include discarding the data packet. In response to the data packet being correctly received, the method may include zeroing a reading number (Nr) that indicates a number of RSSI readings and zeroing a successive number (Ns) that indicates a number of successive RSSI readings that are below or equal to a clear channel assessment energy detection threshold (Pth). The method may include reading an RSSI value. The method may also include determining whether the RSSI value is less than or equal to the Pth. In response to the RSSI value being less than or equal to the Pth, the method may include incrementing the Nr and incrementing the Ns and determining whether the Ns is equal to a particular number (Np) that indicates a particular number of successive RSSI readings below or equal to the Pth. In response to the Ns being equal to the Np, the method may include transmitting an ACK packet. In response to the Ns being not equal to the Np, the method may include waiting for a time interval (Ts). In response to the RSSI value being greater than the Pth, the method may include incrementing the Nr, zeroing the Ns, and determining whether a sum of the Nr and the Np is greater than a maximum number (Nmax) that indicates a maximum number of RSSI readings for interference detection. In response to the sum of the Nr and the Np being greater than the Nmax, the method may include transmitting the ACK packet. In response to the sum of the Nr and the Np being less than Nmax, the method may include waiting for the Ts.

In some examples, a non-transitory computer-readable medium that includes computer-readable instructions, which in response to execution by a processor, cause the processor to perform or cause the processor to control performance of a method. The method may include determining whether a data packet is correctly received. In response to the data packet being incorrectly received, the method may include discarding the data packet. In response to the data packet being correctly received, the method may include zeroing a Nr that indicates a number of RSSI readings and zeroing a Ns that indicates a number of successive RSSI readings that are below or equal to a Pth. The method may include reading an RSSI value. The method may also include determining whether the RSSI value is less than or equal to the Pth. In response to the RSSI value being less than or equal to the Pth, the method may include incrementing the Nr and incrementing the Ns and determining whether the Ns is equal to a Np that indicates a particular number of successive RSSI readings below or equal to the Pth. In response to the Ns being equal to the Np, the method may include transmitting an ACK packet. In response to the Ns being not equal to the Np, the method may include waiting for a Ts. In response to the RSSI value being greater than the Pth, the method may include incrementing the Nr, zeroing the Ns, and determining whether a sum of the Nr and the Np is greater than a Nmax that indicates a maximum number of RSSI readings for interference detection. In response to the sum of the Nr and the Np being greater than the Nmax, the method may include transmitting the ACK packet. In response to the sum of the Nr and the Np being less than Nmax, the method may include waiting for the Ts.

In some examples, a system that may include a first node. The first node may include a first processor and a first module. The first module may be operatively coupled to the first processor and responsive to the first processor to read a RSSI value. The first module may determine whether the RSSI value is less than or equal to a Pth. The first module may, in response to the RSSI value being less than or equal to the Pth increment a Nr that indicates a number of the RSSI readings, increment a Ns that indicates a number of successive RSSI readings that are below or equal to the Pth, and determine whether the Ns is equal to a Np that indicates a particular number of successive RSSI readings below or equal to the Pth. The first module may, in response to the Ns being equal to the Np, transmit an ACK packet. The first module may, in response to the Ns not being equal to the Np, wait for a Ts. The first module may, in response to the RSSI value being greater than the Pth, increment the Nr, zero the Ns, and determine whether a sum of the Nr and the Np is greater than a Nmax that indicates a maximum number of RSSI readings for interference detection. The first module may, in response to the sum of the Nr and the Np being greater than the Nmax, transmit the ACK packet. The first module may, in response to the sum of the Nr and the Np being less than the Nmax, wait for the Ts.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings. In the drawings:

FIG. 6 is a block diagram illustrating an example computing device that is arranged for ACK-ID, all arranged in accordance with at least some embodiments described herein.

DETAILED DESCRIPTION

Figure 1:
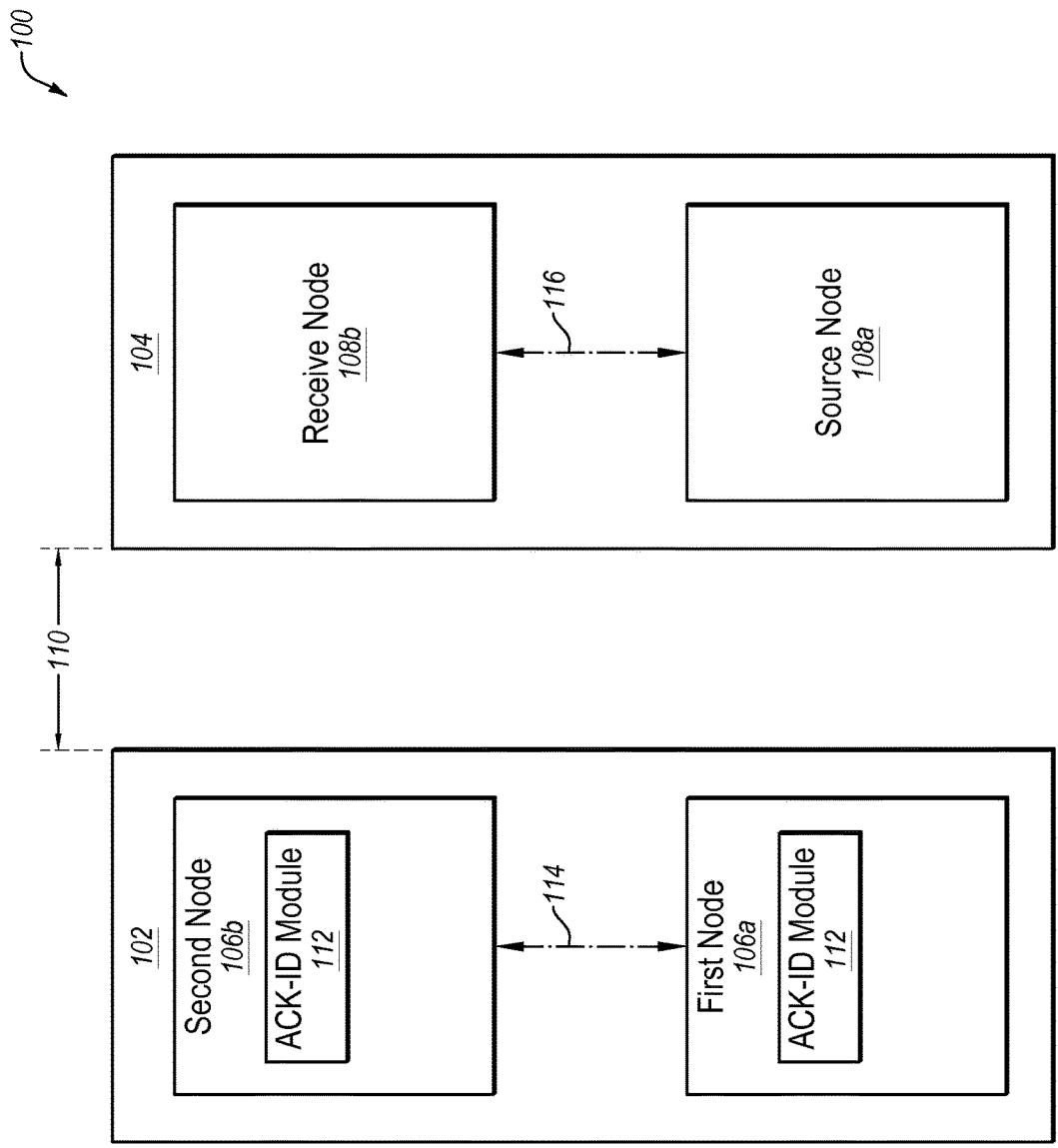
FIG. 1 is a block diagram of an example operating environment in which packet communication in a first network may occur under interference from a second network.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to acknowledgement packet communication with interference detection (ACK-ID).

Briefly stated, in some examples, a method may include determining whether a data packet is correctly received. In response to the data packet being correctly received, the method may include reading a received signal strength indication (RSSI) value, and based on the RSSI value, determining whether to transmit an acknowledgement (ACK) packet.

Studies have shown that low-power wireless sensor networks (WSN), such as ZigBee-based WSN, may be vulnerable to interference from wireless fidelity (Wi-Fi) wireless local area networks (WLAN). Specifically, there may be performance degradation exhibited in the ZigBee-based WSN (e.g., a IEEE 802.15.4 network) when subjected to interference from a WLAN. A contributor to the degradation may be loss of ACK packets due to interfering traffic from the WLAN. The losses of ACK packets may result in retransmission of data packets in a WSN. The retransmission may waste channel bandwidth and energy.

Some embodiments disclosed herein include a method of ACK-ID. The ACK-ID may be usable, for example, in a WSN such as a ZigBee-based WSN. The ACK-ID may reduce ACK packet losses and may consequently reduce data packet retransmissions. The ACK-ID may improve the performance of a WSN in terms of ACK packet delivery rate and packet retransmission rate while operating under interference from a WLAN or other network(s) that may interfere with the WSN.

FIG. 1 is a block diagram of an example operating environment 100 in which packet communication in a first network 102 may occur under interference from a second network 104, arranged in accordance with at least some embodiments described herein. The first network 102 may include a first node 106*a* and a second node 106*b*. The first node 106*a* may be configured to communicate with the second node 106*b*. Additionally, the second node 106*b* may be configured to communicate with the first node 106*a*. At least some of the communication (referred to herein as first network traffic 114) between the first node 106*a* and the second node 106*b* may include data packets and ACK packets.

The second network 104 may include a source node 108*a* and a receive node 108*b*. The source node 108*a* may be configured to transmit or otherwise provide a signal that enables the receive node 108*b* to communicate data in the second network 104. The data communicated in the second network 104 is referred to herein as second network traffic 116.

Generally, the first network 102 and the second network 104 may be within some proximity 110 of one another. The proximity 110 between the first network 102 and the second network 104 may cause interference between data communicated in the first network 102 and the second network traffic 116 communicated in the second network 104. In particular, the interference may cause failure (which may include loss and/or corruption of packets) and/or delay of transmission of ACK packets and/or data packets between the first node 106a and the second node 106b. The failure and/or the delay of transmission of the ACK packets and/or the data packets may result in retransmission of data packets between the first node 106a and the second node 106b.

In the first network 102, packet communication, generally indicated by the first network traffic 114, may include communication of a data packet and responsive transmission of an ACK packet. Specifically, the first node 106a (or the second node 106b) may transmit the data packet to the second node 106b (or the first node 106a). The first node 106a may then wait for the ACK packet for a wait time. The second node 106b may receive the data packet and transmit the ACK packet to the first node 106a. When the first node 106a receives the ACK packet before expiration of the wait time, the data packet communication is complete. The first node 102a may then prepare for communication of a next data packet.

Additionally, in the first network 102, the data packets and ACK packets (collectively, packets) may be lost in any of a variety of circumstances, some of which may result in a retransmission of the data packets and/or losses of data packets. Some examples (a non-exhaustive list) of such circumstances are discussed below.

In an example of a first circumstance, the packets may be cancelled due to clear channel assessment (CCA) detection failures. For example, the first node 106a may sense availability or unavailability of a channel using the CCA before communicating the data packets. If the channel is determined to be unavailable, then the communication of the data packet may be backed off. For instance, the communication of the data packet may be delayed pending reassessment of the channel. The first node 106a may wait for a next sensing period and then reassess the channel. After reaching a maximum number of allowed backoffs, the data packet may be dropped.

In an example of a second circumstance, data packets may be lost due to collisions with the second network traffic 116. For example, in some embodiments, data may be communicated in the first network 102 at a slower speed than the second network traffic 116. Thus, while the data packet is being communicated in the first network 102, it is possible that the second network traffic 116 may begin being communicated from the source node 108a to the receive node 108b. Because of this overlap, the second network traffic 116 may interfere with the data packet communicated in the first network 102 and thus communication of the data packet in the first network 102 may fail.

In an example of a third circumstance, data packets may be dropped due to register overflow (e.g., CC2420 Transmit First-In First-Out Byte Register (TXFIFO)). For example, the data packets may be generated at a substantially constant data packet generation interval. Additionally, a transmission time for completing the data packet transmission may include a particular duration. The transmission time may include multiple times. For example, the transmission time may include a summation of a time for the data packet transmission, a time for the data packet re-transmission, a time for transmission of the ACK packet, and a time for CCA detection. If the transmission time exceeds the data packet generation interval, a newly-generated data packet may be dropped if communication of a previous data packet is still in process and occupying the register.

In an example of a fourth circumstance, the ACK packet may be lost, yet there may be a successful data packet communication. Specifically, the first node 106a may have succeeded in transmitting the data packet to the second node 106b. However, the ACK packet transmitted by the second node 106b may fail to reach the first node 106a due to interference from the second network traffic 116. Because the first node 106a does not receive an expected ACK packet, communication of the data packet may be assumed to have failed. After the expiration of the wait time, the first node 106a may retransmit the data packet to the second node 106b. The retransmitted data packet may reach the second node 106b, but may be discarded upon reception because of duplication.

In an example of a fifth circumstance, the ACK packet may be lost and there may be an unsuccessful retransmitted data packet communication. Similar to the fourth circumstance, the data packet may be successfully transmitted from the first node 106a to the second node 106b and the ACK packet may be lost. After the expiration of the wait time, the first node 106a may retransmit the data packet. The retransmitted data packet may also be lost, not reaching the second node 106b. In this circumstance, although the first node 106a may not "know" the status of the data packet communication, the second node 106b may receive the data packet.

In an example of a sixth circumstance, a lost data packet in a first transmission attempt may be successfully received in retransmission. The first node 106a may communicate the data packet to the second node 106b, which may be lost in the communication. The second node 106b may not receive the data packet, and therefore may not respond with the ACK packet. The first node 106a may retransmit the data packet after the wait time. The data packet may be retransmitted, received by the second node 106b, and the ACK packet may be communicated to the first node 106a.

In an example of a seventh circumstance, the data packet may be lost in a first transmission attempt, successful in retransmission, but the ACK packet may be lost. The seventh circumstance may be similar to the sixth circumstance, except the first node 106a may retransmit the data packet.

In an example of an eighth circumstance the data packet may be lost in multiple transmission attempts. In the eighth circumstance, neither the originally communicated data packet nor the retransmitted data packet reaches the second node 106b. As a result, the data packet may be lost.

In an example of a ninth circumstance, the ACK packet may be lost and the data packet retransmission attempt may fail due to CCA detection failure. In the ninth circumstance, a first data packet transmission attempt may be successful, but a responsive ACK packet may be lost. The first node 106a may fail to retransmit the data packet due to CCA detection failure.

In an example of a tenth circumstance, the first data packet transmission may fail and a retransmission of the data packet may be aborted due to CCA detection failure. In the tenth circumstance, the data packet is lost.

To reduce packet loss as in one or more of the above and/or other circumstances or combinations thereof, in some embodiments, the first node 106a and/or the second node 106b may include an ACK-ID module 112. The ACK-ID module 112 may be configured to detect interference, which may be caused by the second network traffic 116 of a channel prior to transmitting the ACK packet. Based on the detected interference, the ACK-ID module 112 may determine whether to transmit the ACK packet or to continue detecting interference. By determining whether to transmit the ACK packet based on the detected interference, a higher portion of the ACK packets may be successfully communicated, which may reduce an amount of retransmitted data packets. The ACK-ID module 112 according to some embodiments may be embedded into firmware of a node or device such as a Crossbow MICAz mote as one example. Additionally or alternatively, the ACK-ID module 112 may be deployed in a standard-based wireless communication device, a sensor, in a consumer electronic device, a ZigBee/IEEE 802.15.4 device, or other suitable device.

The ACK-ID module 112 and/or any of the other module(s) described in this disclosure may include code and routines to provide the function or operations as described herein. In some embodiments, the ACK-ID module 112 and/or any of the other module(s) described herein may be implemented using hardware including a field-programmable gate array (FPGA) or an application-specific integrated circuit (ASIC). Alternately or additionally, the ACK-ID module 112 and/or any of the other module(s) described herein may be implemented using a combination of hardware and software. In some embodiments, the ACK-ID module 112 and/or any of the other module(s) described herein may be embodied by one or more processors. Still further in some embodiments, processor(s) may be configured to execute computer-readable instructions stored on a non-transitory computer-readable medium that is operatively coupled to the processor(s), in order to provide the features, operations, and functionality of the ACK-ID module 112 and/or any of the other module(s) described herein.

One or more of the first node 106a and/or the second node 106b (and/or other computing device, mote, or other network device) may include a storage device which may include a non-transitory memory (which may be an embodiment of the computer-readable medium described above) that stores data for providing the features, operations, and functionality described herein. The memory may include a dynamic random access memory (DRAM) device, a static random access memory (SRAM) device, flash memory, or some other memory device(s) configured to perform storage. In some embodiments, the storage device may include a non-volatile memory or similar permanent storage device and media including a hard disk drive(HDD), a flash memory device, or some other mass storage device for storing information on a more permanent basis.

In one example, the first node 106a may receive the data packet from the second node 106b. The ACK-ID module 112 of the first node 106a may determine whether the data packet is correctly received. If the data packet is incorrectly received, then the ACK-ID module 112 of the first node 106a may discard the data packet.

In comparison, a correctly received data frame may trigger the generation of an ACK packet at the first node 106a. In some embodiments, a generated ACK packet may contain a same data sequence number (DSN) of the data packet that it is generated to acknowledge.

Additionally, in response to the data packet being correctly received, the ACK-ID module 112 of the first node 106a may zero a reading number (Nr), zero a successive number (Ns), and read one or more received signal strength indication (RSSI) values. Generally, the RSSI value(s) may indicate availability or unavailability of a channel on which the ACK packet may be transmitted. The Nr may indicate a number of RSSI readings. The Ns may indicate a number of successive RSSI readings that are below or equal to a CCA energy detection threshold (Pth). For example, a CCA function (e.g., an 802.11 CCA) related to carrier sense may be used to detect energy level of the second network traffic 116 which may be present on a current channel (e.g., a frequency range) based on a noise floor, an ambient energy, an interference source, unidentifiable transmissions, or some combination thereof. Additionally, in response to the data packet being correctly received, the ACK-ID module 112 of the first node 106a may read an RSSI value. The ACK-ID module 112 of the first node 106a may then determine whether the RSSI value is greater than the Pth.

If the RSSI value is less than or equal to the Pth, then the ACK-ID module 112 of the first node 106a may increment the Nr and the Ns. Incrementing the Nr and the Ns may include adding one to values of the Nr and the Ns. For example, if the Nr and the Ns have a value of zero prior to incrementing by the ACK-ID module 112 of the first node 106a, then the Nr and the Ns may have a value of one after the incrementing.

The ACK-ID module 112 of the first node 106a may then determine whether the Ns is equal to a particular number (Np). The Np may indicate a particular number of successive RSSI readings below or equal to the Pth. If the Ns is equal to the Np, then the ACK-ID module 112 of the first node 106a may transmit the ACK packet to the second node 106b. If the Ns is not equal to the Np, then the ACK-ID module 112 of the first node 106a may wait for a time interval (Ts). The Ts may include a particular time interval between two successive RSSI readings. An example of the Ts may include about 16 microseconds (p), in some embodiments. After waiting for the Ts, the ACK-ID module 112 of the first node 106a may then read a successive RSSI value and repeat one or more processes herein based on the successive RSSI value.

If the RSSI value is greater than the Pth, then the ACK-ID module 112 of the first node 106a may increment the Nr and may zero the Ns. The ACK-ID module 112 of the first node 106a may determine whether a sum of the Nr and the Np is greater than a maximum number (Nmax). The Nmax may indicate a maximum number of RSSI readings for interference detection. If the sum of the Nr and the Np is greater than the Nmax, then the ACK-ID module 112 of the first node 106a may transmit the ACK packet to the second node 106b. If the sum of the Nr and the Np is less than the Nmax, then the ACK-ID module 112 of the first node 106a may wait for the Ts. After the Ts, the ACK-ID module 112 of the first node 106a may then read a successive RSSI value and may repeat one or more of the processes herein based on the successive RSSI value.

The ACK-ID module 112 of the second node 106b may wait for a period of time for the ACK packet to be received. The period of time for the corresponding ACK packet to be received is referred to as the wait time or defined as the "macAckWaitDuration" as discussed below. If the ACK packet is received within the wait time, then the transmission is considered successful and retransmission may not occur. If the ACK packet is not received within the wait time, then the second node 106b may conclude that the attempted transmission of the data packet has failed.

The second node 106b may then repeat the process of transmitting the data packet and waiting for the ACK packet a particular number of times. The particular number of times may be defined as "macMaxFrameRetries." If none of the attempts succeed, the second node 106b may determine that the transmission of the data frame has failed. The ACK-ID module 112 of the second node 106b may drop the data packet from a transmission buffer such that a new data frame may be stored and/or attempted to be transmitted.

The above examples are described in the context of the first node 106a being the recipient node, while the second node 106b is the transmit node, and subsets of the operations are described above with respect to the ACK-ID module 112 of the first node 106a or the ACK-ID module 112 of the second node 106b. Similar operations may be performed by either or both of the ACK-ID modules 112 of the first node 106a and the second node 106b, depending on which of the first node 106a and the second node 106b operates as a recipient node or a transmit node for a data packet.

In some embodiments, a delay in the communication of the ACK packet may occur after reception of the data packet. The ACK-ID module 112 of the transmit node may take into consideration the delay when setting the wait time for receiving the ACK packet in response to transmitting the data packet. In the example described above, the second node 106b transmits the data packet to the first node 106a and the first node 106a transmits the ACK packet to the second node 106b. Accordingly, in this example, the ACK-ID module 112 of the second node 106b may set the wait time for receiving the ACK packet.

For example, as stated above, the wait time for the ACK packet to arrive following a transmitted data packet may be defined as the macAckWaitDuration. In addition, a time for the Nmax may be defined as "maxACK-IDTime." A basic time period used by an implemented communication algorithm (e.g., the CSMA/CA algorithm) may be defined as "UnitbackoffPeriod." A turn-around time for receive-to-transmit may be defined as "TurnaroundTime." A duration for octets (e.g., synchronization header (SHR), a physical header (PHR), and physical (PHY) service data unit (PSDU)) of the ACK packet may be defined as "phyACK-Duration." Accordingly, the macAckWaitDuration may be set as the sum of the UnitbackoffPeriod, the TurnaroundTime, the phyACKDuration, and the maxACK-IDTime.

While in the example described above, the second node 106b transmits the data packet to the first node 106a and the first node 106a transmits the ACK packet to the second node 106b, the ACK-ID module 112 of the second node 106b may operate similarly when the first node 106a transmits the data packet to the second node 106b and the second node 106b transmits the ACK packet to the first node 106a.

Moreover, although the first network 102 is illustrated in FIG. 1 as including two nodes (e.g., the first node 106a and the second node 106b), more generally, the first network 102 may include two or more nodes and any subset thereof may include an ACK-ID module such as the ACK-ID module 112. Likewise, the second network 104 may include multiple source nodes 108a and/or multiple receive nodes 108b. Additionally or alternatively, the operating environment 100 may include multiple other networks on which traffic may be communicated that could interfere with the ACK packets and/or the data packets of the first network 102.

The first network 102 and the second network 104 may include different types of networks or a single type of network. As used herein, the term "type(s) of network(s)" may indicate devices (e.g., the first node 106a and the second node 106b) that may be configured to communicate using a common communication standard. For example, the first network 102 may include a ZigBee network and the second network 104 may include a second ZigBee network. Alternatively, the first network 102 may include a Bluetooth network (e.g., a network having devices substantially compliant with IEEE 802.15.1 or equivalent special interest group (SIG) standard) and the second network 104 may include a Wi-Fi network. In still another example, the first network 102 may include a ZigBee network and the second network 104 may include a Wi-Fi network, a Bluetooth network, and/or other network (including combinations thereof) that is different from a ZigBee network. Communication standards may include, but are not limited to, IEEE 802 standards such as 802.11g, 802.11b/g/n, 802.11a/g/n, 802.11g, and 802.15.4.

Figure 2A:
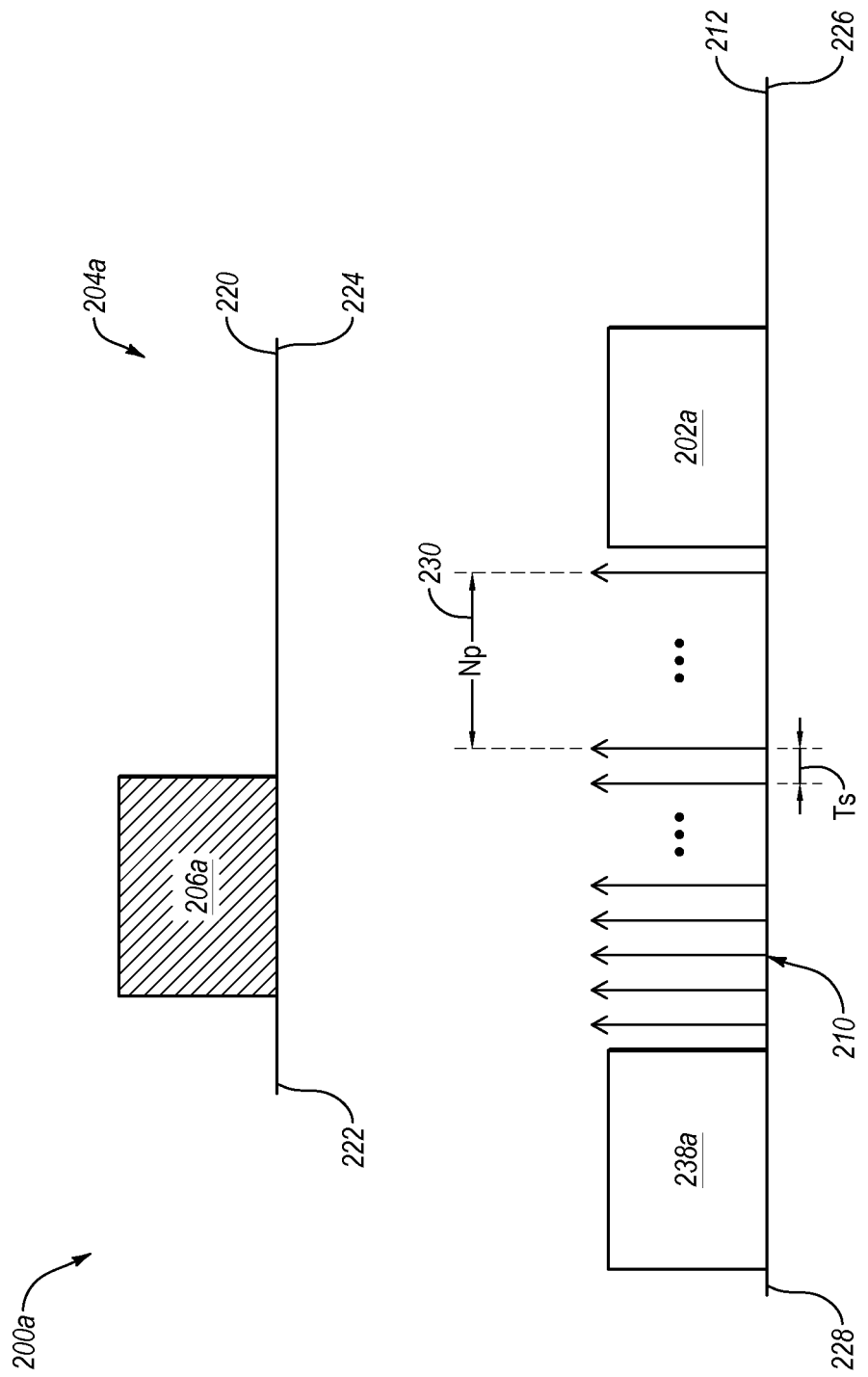
FIGS. 2*a* and 2*b* respectively illustrate an example of a first acknowledgement communication with interference detection (ACK-ID) process and an example of a second ACK-ID process that may be performed in the operating environment of FIG. 1.
Figure 2B:
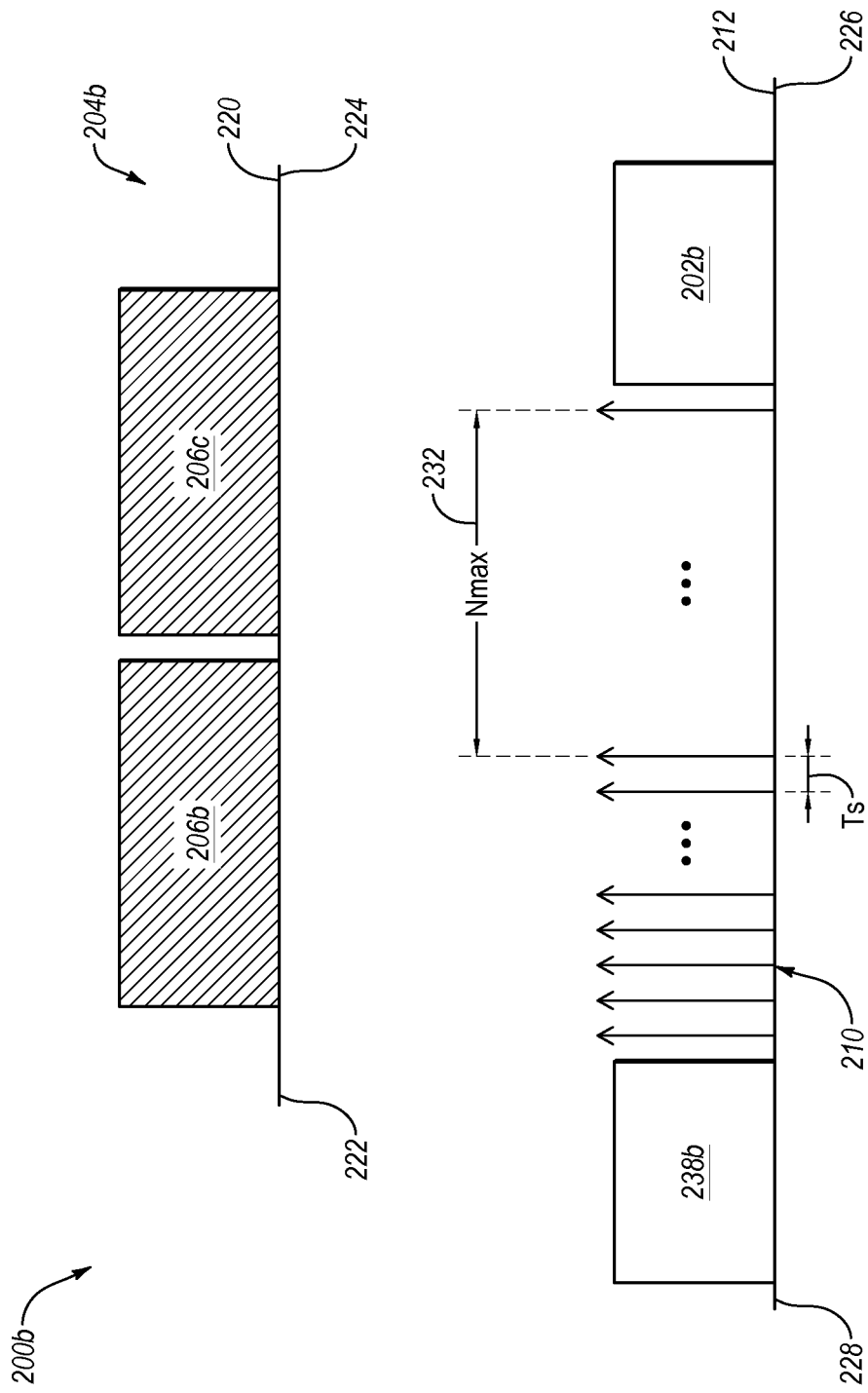

FIGS. 2a and 2b respectively illustrate an example of a first ACK-ID process 200A and an example of a second ACK-ID process 200B (generally, ACK-ID process 200 or ACK-ID processes 200) that may be performed in the operating environment 100 of FIG. 1, arranged in accordance with at least some embodiments described herein. The ACK-ID processes 200 may be implemented, for example, using an ACK-ID module, such as the ACK-ID module 112 of FIG. 1.

With combined reference to FIGS. 2a and 2b, the ACK-ID processes 200 may include a first reference line 220 and a second reference line 212. The first reference line 220 may represent a reference to a first node from which interfering traffic 206a (of FIG. 2a) and 206b-206c (of FIG. 2b) may originate. The second reference line 212 may represent a reference to a second node from which a first ACK packet 202a of FIG. 2a and a second ACK packet 202b of FIG. 2b may originate. Additionally, RSSI readings, which are represented in FIGS. 2a and 2b by arrows 210, may also originate at the second reference line 212. The first reference line 220 and the second reference line 212 depict changes in the interference conditions of a first channel 204a (FIG. 2a) and a second channel 204b (FIG. 2b) over time. Circumstances at a first end 222 of the first reference line 220 may have occurred before circumstances at a second end 224 of the first reference line 220. In addition, circumstances at a first end 228 of the second reference line 212 may have occurred before circumstances at a second end 226 of the second reference line 212.

In some embodiments of the ACK-ID processes 200, prior to transmitting the first ACK packet 202a or the second ACK packet 202b, interference caused by the interfering traffic 206a-206c may be detected. For example, the interference may be detected through reading RSSI values at the Ts. In FIGS. 2a and 2b, one of the arrows representing the RSSI readings 210 is labeled. Based on the RSSI values, it may be decided whether the first channel 204a or the second channel 204b is experiencing interference. Moreover, based on a number of successive RSSI values below or equal to a Pth, it may be determined whether and/or when to transmit the first ACK packet 202a or the second ACK packet 202b.

The first ACK-ID process 200a of the first channel 204a is depicted in FIG. 2a. After successfully receiving a first data packet 238a, the RSSI readings 210 may be read at the Ts. The RSSI readings 210 may be compared to the Pth (discussed elsewhere herein). After Np 230 successive RSSI readings 210 that are less than or equal to the Pth, it may be determined that transmission of the first ACK packet 202a on the first channel 204a may start.

In some embodiments, the first ACK packet 202a may be relatively short. For example, the first ACK packet 202a may include about 11 bytes. Accordingly, the first ACK-ID process 200a may have a successful delivery rate when transmission of the first ACK packet 202a starts when the first channel 204a is detected to be idle, which may be indicated through the Np 230 successive RSSI readings 210 that are less than or equal to the Pth. Additionally, use of the Pth for interference detection may improve the successful ACK packet transmission.

The second ACK-ID process 200b of the second channel 204b is depicted in FIG. 2b. After successfully receiving a second data packet 238b, the RSSI readings 210 may be read at the Ts. The RSSI readings 210 may be compared to the Pth. If after Nmax 232 successive RSSI readings 210, there has not been the Np (e.g., the Np 230 of FIG. 2a) successive RSSI readings 210 below or equal to the Pth, then the second ACK packet 202b may be transmitted. For example, after the Nmax 232 successive RSSI readings 210, the second ACK packet 202b may be communicated regardless of the interfering traffic 206b-206c. In circumstances including the Nmax 232 successive RSSI readings 210, the wait time of a transmit node, which may be waiting for the second ACK packet 202b, may be expiring. Accordingly, the communication of the second ACK packet 202b may at least provide a chance of successfully transmitting the second ACK packet 202b. In some alternative embodiments, the second ACK packet 202b may be transmitted before acquiring the Nmax 232 of the RSSI readings 210. For instance, the second ACK packet 202b may be transmitted after a particular wait time.

With combined reference to FIGS. 2a and 2b, in an example embodiment of the ACK-ID processes 200, an interference detection process may be performed before transmitting a ZigBee ACK packet, which may be represented in FIGS. 2a and 2b by 202a or 202b. For example, after successfully receiving a ZigBee packet, which may be represented in FIGS. 2a and 2b as the data packets 238a or 238b, a ZigBee coordinator (and/or other component of the recipient device) may read the RSSI readings 210 at the Ts. The Ts in embodiments in which ZigBee ACK packets are communicated may include a symbol duration of about 16 μs, for example. Transmission of the first ACK packet 206a may start after the Np 230 (e.g., two) successive RSSI readings 210 are below or equal to the Pth as depicted in FIG. 2a. If after the Nmax 232 (e.g., 20; also Nmax 232>Np 230) successive RSSI readings 210 there has not been Np 230 successive RSSI readings 210 below or equal to the Pth, the second ACK packet 206b may be transmitted. For example, the second ACK packet 206b may be transmitted after a final RSSI reading 210 has been confirmed by an acknowledging ZigBee mote. Use of the ACK-ID processes 200 for interference detection may improve the successful delivery of one or both of the first ACK packet 206a or the second ACK packet 206b.

Figure 3:
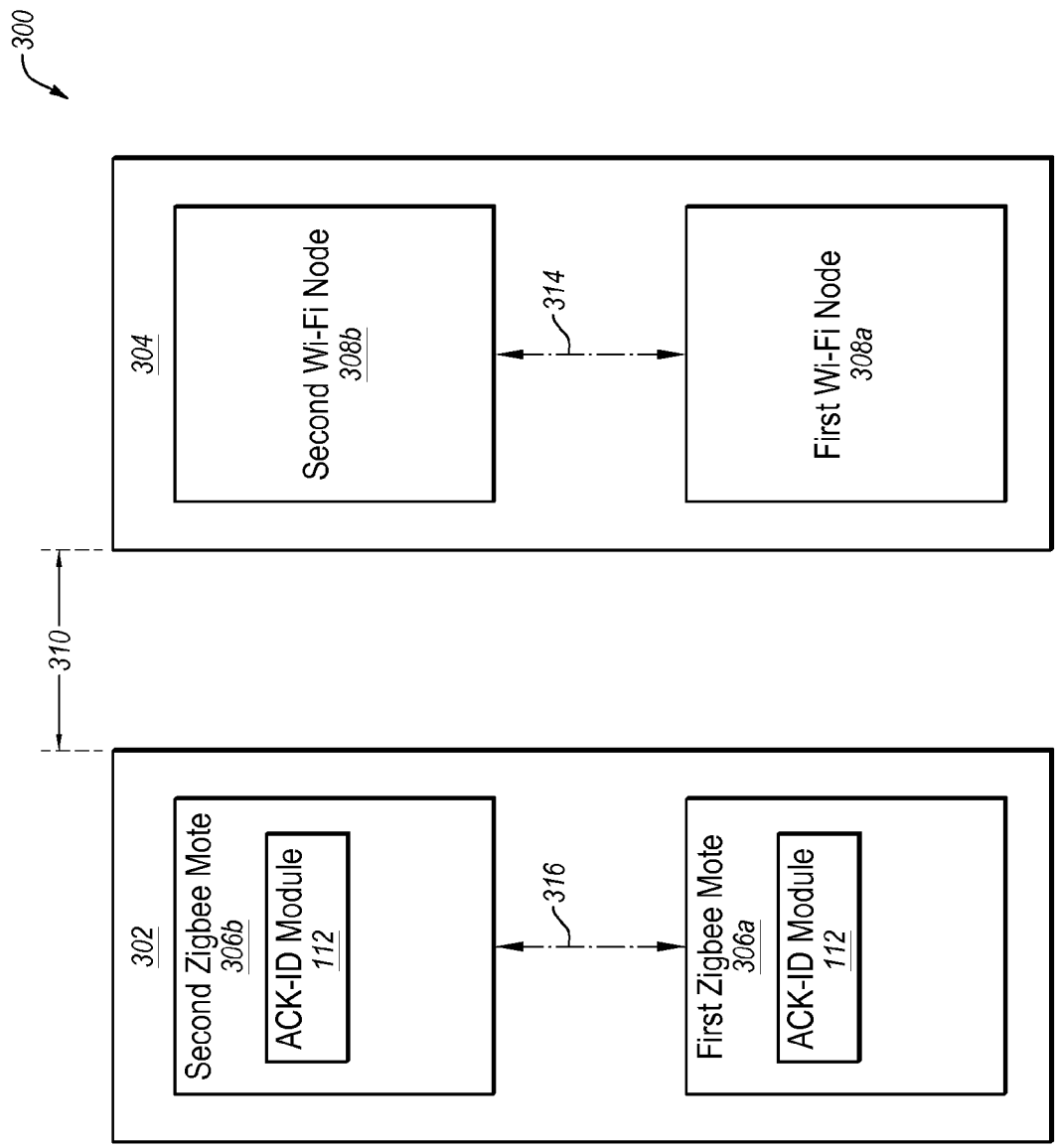
FIG. 3 illustrates an example ZigBee/Wi-Fi operating environment.

FIG. 3 illustrates an example ZigBee/Wi-Fi operating environment 300, arranged in accordance with at least some embodiments described herein. The ZigBee/Wi-Fi operating environment 300 may be a particular embodiment of the operating environment 100 of FIG. 1. Specifically, in the ZigBee/Wi-Fi operating environment 300, the first network 102 of FIG. 1 may include a ZigBee-type network 302 and the second network 104 of FIG. 1 may include a Wi-Fi-type WLAN 304. A proximity 310 between the ZigBee-type network 302 and the WLAN 304 may be about one meter, for instance. The proximity 310 may cause Wi-Fi traffic 314 to interfere with packet communication 316 in the ZigBee-type network 302. Additionally, in the ZigBee/Wi-Fi operating environment 300, ZigBee ACK packets may be transmitted as described with reference to FIGS. 2a and 2b.

The ZigBee-type network 302 may include a first ZigBee mote 306a and a second ZigBee mote 306b. The first ZigBee mote 306a and/or the second ZigBee mote 306b may each include the ACK-ID module 112 discussed with reference to FIG. 1. The WLAN 304 may include a first Wi-Fi node 308a and a second Wi-Fi node 308b.

In some embodiments, the WLAN 304 may include an IEEE 802.11b/g/n wireless router or another suitable Wi-Fi source as the first Wi-Fi node 308a. Additionally or alternatively, the WLAN 304 may include a laptop with Wi-Fi adapter or another suitable Wi-Fi sink as the second Wi-Fi node 308b. The Wi-Fi traffic 314 between the second Wi-Fi node 308b and the first Wi-Fi node 308a may substantially comply with the IEEE 802.11a/g/n or any other communication standard.

The ZigBee-type network 302 may include, for example, a Crossbow MICAz mote equipped with IEEE 802.15.4-compliant CC2420 transceiver or any other suitable ZigBee client as the first ZigBee mote 306a. Additionally or alternatively, the ZigBee-type network 302 may include, for example, a MICAz mote installed on a Crossbow MIB600 programming board or any other suitable ZigBee coordinator as the second ZigBee-type mote 306b. The second ZigBee mote 306b may communicate IEEE 802.15.4 traffic (and/or other types of traffic) to the first ZigBee mote 306a and vice versa.

The second ZigBee mote 306b and/or the first ZigBee mote 306a may be configured to read the RSSI value, which may be used for monitoring the external interference (e.g., the Wi-Fi traffic 314). In addition, the Pth and transmit power of the second ZigBee mote 306b and/or the first ZigBee mote 306a may be adjusted by the ACK-ID module 112 and/or by some other module(s)/component(s) or combinations thereof that may be operatively coupled to each other. CCA may be performed before the transmission of each packet. For example, a default CCA mode of a CC2420 of MICAz may adopt both carrier sense and energy detection (CS-ED) with a Pth of about −77 decibel per milliwatt (dBm).

In some embodiments, a media access control (MAC) layer of the second ZigBee mote 306b and/or the first ZigBee mote 306a may implement operations or functionalities of acknowledgement and retransmission. For convenience of terminology, in the following text, the term "packet" may refer to a physical (PHY) layer data unit while the term "frame" may refer to the MAC layer data unit.

The MAC layer frame may be passed to the PHY layer as the PHY service data unit (PSDU). The PSDU may be prefixed with a synchronization header (SHR) and a PHY header (PHR), forming the PHY packet. After each data packet transmission, a transmit mote (e.g., the second ZigBee mote 306b or the first ZigBee mote 306a) may wait to receive an ACK packet from a receive mote (e.g., the other of the second ZigBee mote 306b or the first ZigBee mote 306a).

In some embodiments of the ZigBee/Wi-Fi operating environment 300, the macAckWaitDuration may be determined according to one or more time periods specific to the second ZigBee mote 306b and/or the first ZigBee mote 306a. For example, a UnitbackoffPeriod may include about a 20-symbol duration, a TurnaroundTime may include about a 12-symbol duration, and a phyACKDuration may include about a 22-symbol duration.

Regarding maxACK-IDTime, a maximum IEEE 802.11g MAC protocol data unit (MPDU) size may be 2346 bytes, for example. Thus, a channel occupation time for a Wi-Fi packet included in the Wi-Fi traffic 314 may not exceed about 0.42 millisecond (ms), for instance. For example, an interfering Wi-Fi packet may have an MPDU size of about 1500 bytes, which for instance may correspond to channel occupation time of less than about 0.3 ms with a transmission speed of about 54 megabits per second (Mbps). In these and other embodiments, the ACK-ID module 112 may adopt the Ts equal to about 16 μs and the Nmax of 20, for example. Thus, the maxACK-IDTime may be around 0.32 ms, for instance, which may enable collisions between the ACK packets and the Wi-Fi traffic 314 to be largely avoided. The macAckWaitDuration for the ZigBee/Wi-Fi operating environment 300 may accordingly be a sum of a 54-symbol duration and a 0.32 ms duration for the MPDU, for example.

FIGS. 4a-4d depict example results for operations conducted in an example operating environment similar to the ZigBee/Wi-Fi operating environment 300 of FIG. 3, arranged in accordance with at least some embodiments described herein. With reference to FIGS. 4a-4d, in the example operating environment, a ZigBee source mote (e.g., the second ZigBee mote 306b) may generate traffic with a constant packet rate of 50 packets/second and packet length of 100 bytes/packet, for example. After each packet transmission, the ZigBee source mote may wait for the ACK packet. If the ACK packet is not received within macAck-WaitDuration (described above), the ZigBee source mote may retransmit the data packet one time (e.g., setting macMaxFrameRetries=1).

An interference network (e.g., the WLAN 304) may generate user datagram protocol (UDP) traffic with varying packet payload, packet rate and distribution, and/or varying inter-departure time (IDT), which may be converted to varying IEEE 802.11g Wi-Fi interference by a wireless router. The packet payload size of the generated UDP traffic may be limited to about 1500 bytes or fewer, for example, which may assist in avoiding possible packet fragmentation.

The ZigBee packet transmission performance of ACK packets with and without use of an ACK-ID module (e.g., the ACK-ID module 112 of FIG. 1) may be assessed in terms of ACK packet delivery rate, packet retransmission rate, and duplicate packet received rate. Examples of the corresponding results are illustrated in and discussed with respect to FIGS. 4a-4d. The data points may be marked with some amount of a confidence interval, for example, a 95% confidence interval.

Figure 4A:
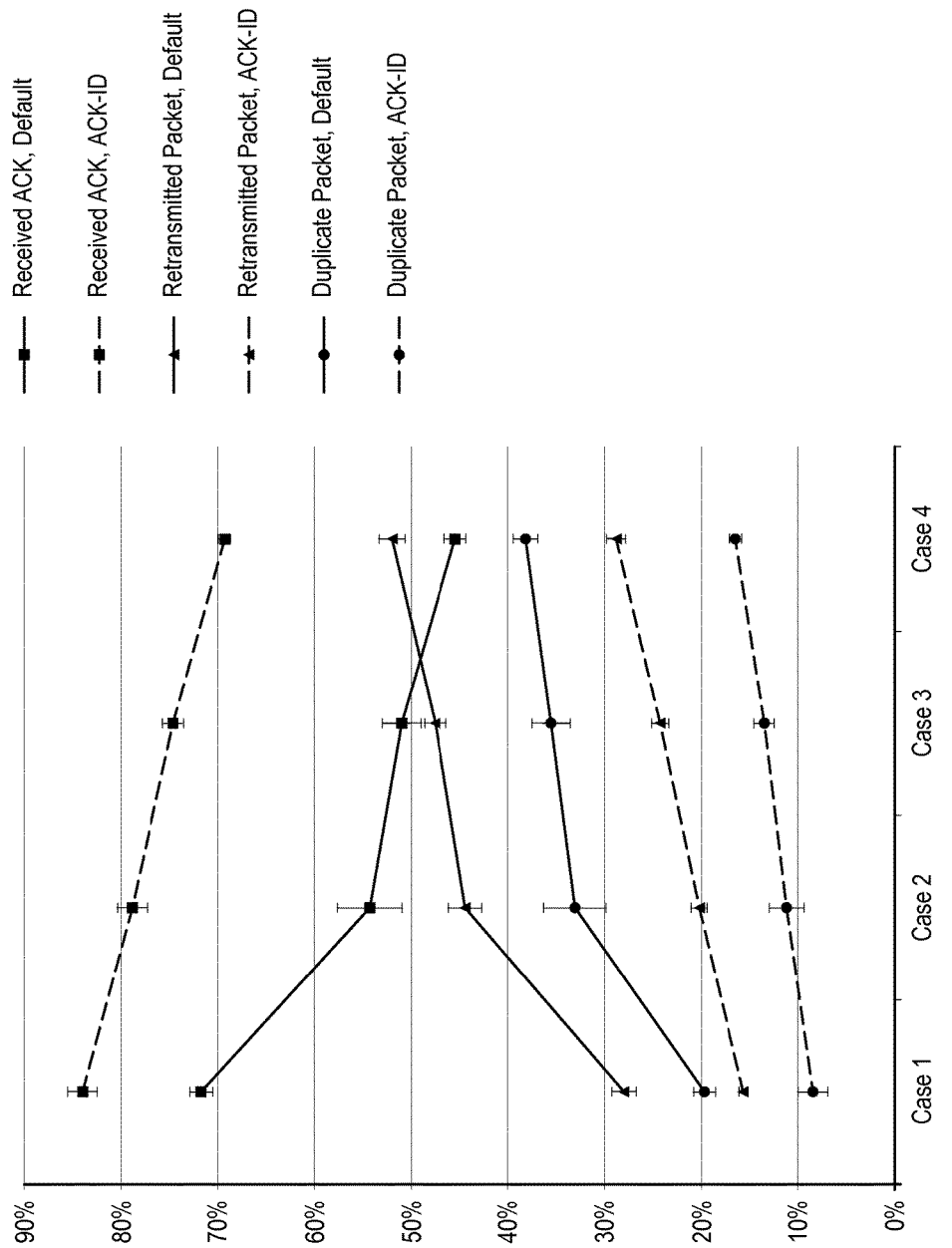
FIGS. 4*a*-4*d* depict example results for operations conducted in an example operating environment similar to the ZigBee/Wi-Fi operating environment of FIG. 3.

FIG. 4a depicts an example of the ZigBee packet transmission performance when the generated UDP traffic has a constant packet IDT, a payload size of 1400 bytes, and different packet rates. In FIG. 4a, Case 1 includes a 300 packets/second rate, Case 2 includes a 400 packets/second rate, Case 3 includes a 500 packets/second rate, and Case 4 includes a 600 packets/second rate.

Figure 4B:
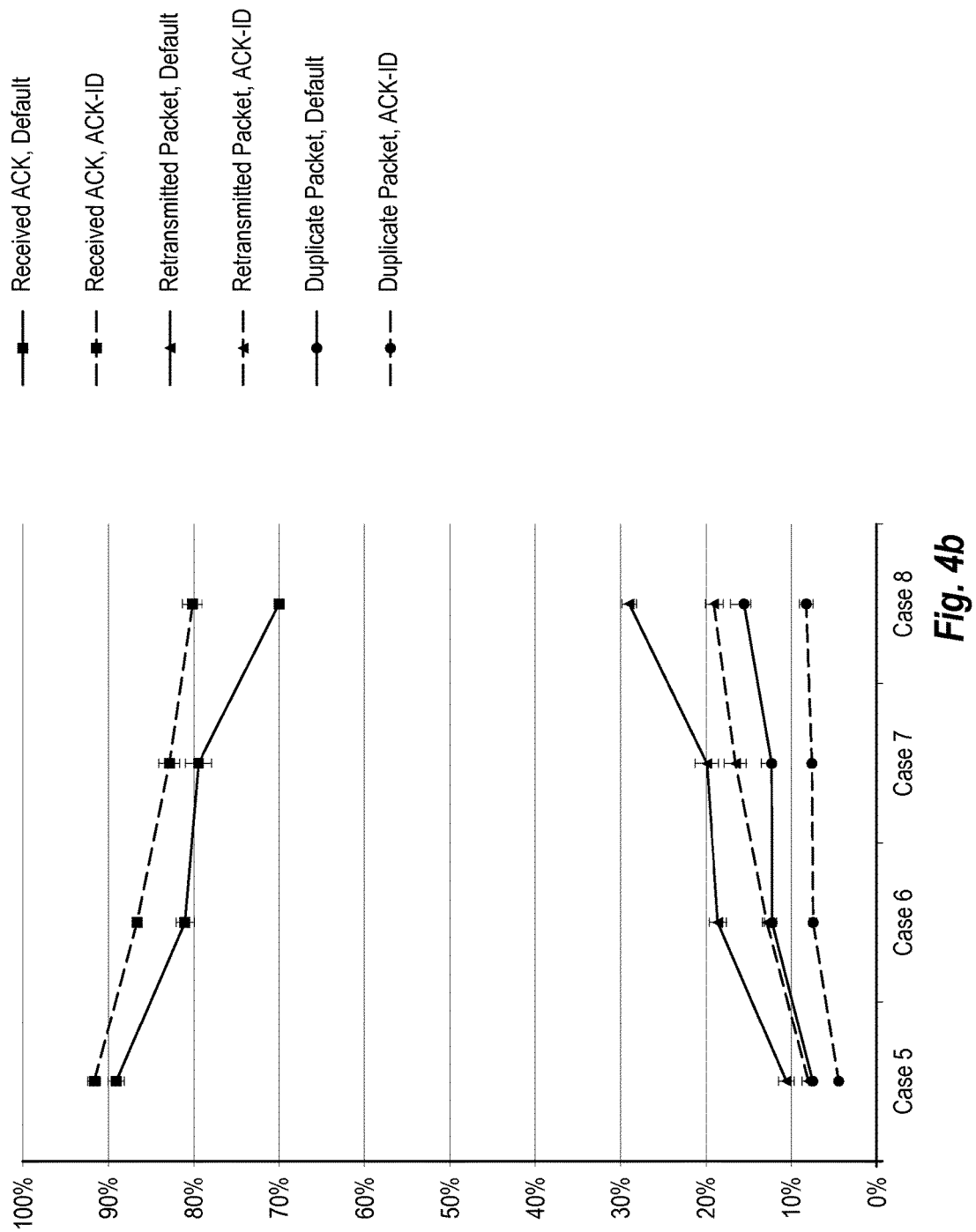

FIG. 4b depicts example results that correspond to a case in which the UDP traffic includes packet sequences having constant packet IDT at the rate of 500 packets/second. FIG. 4b includes the example results as performance is evaluated for four different payload sizes. Case 5 includes a payload size of 500 bytes. Case 6 includes a payload size of 700 bytes. Case 7 includes a payload size of 900 bytes. Case 8 includes a payload size of 1100 bytes.

Figure 4C:
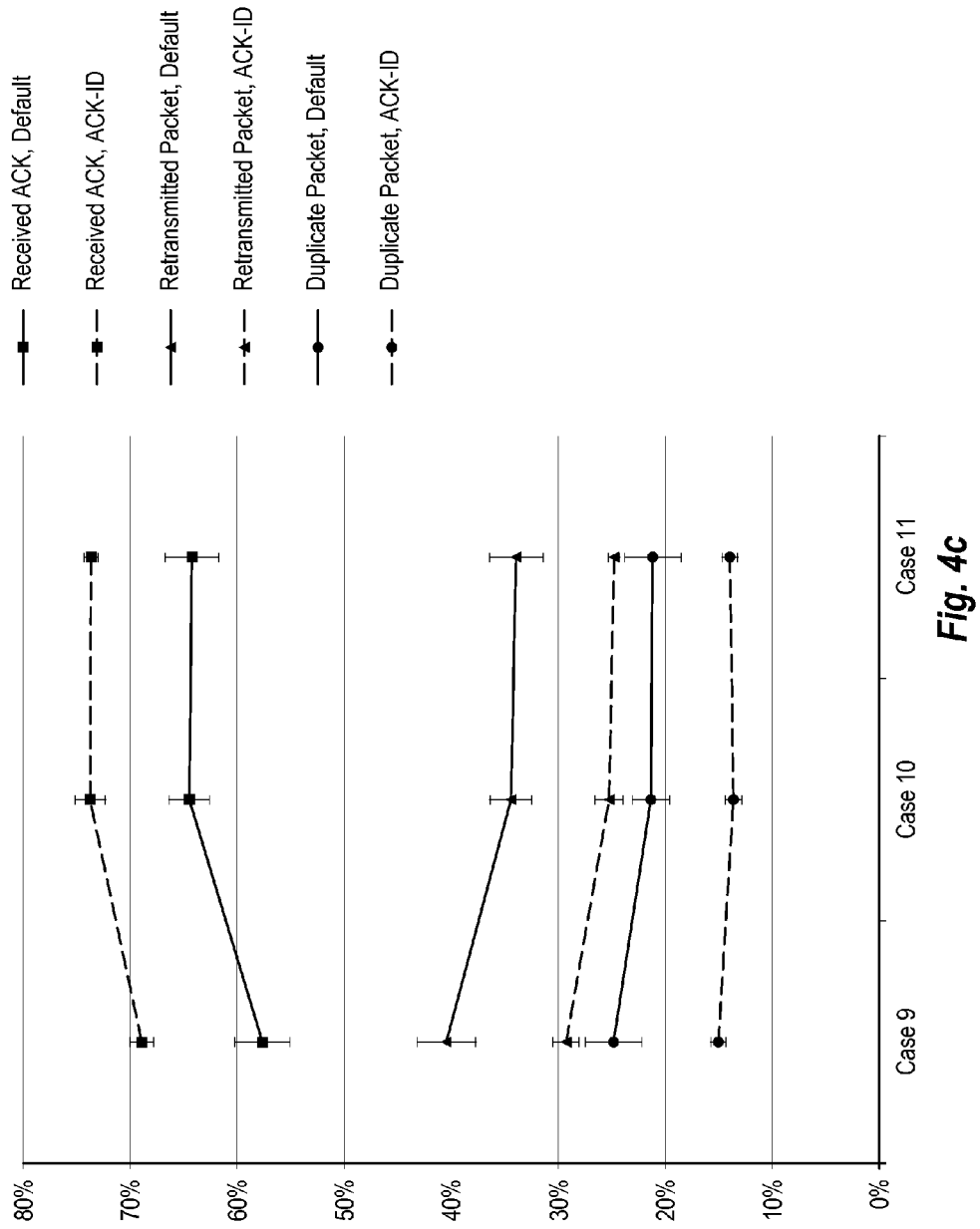

FIG. 4c depicts example results from an example situation in which the UDP traffic includes packets generated to have the same payload size of 1400 bytes and the IDT configured with three random distributions. Case 9 has a Poisson random distribution, for example. Case 10 has an exponential random distribution, for example. Case 11 has a uniform random distribution, for example. A mean arrival rate of Cases 9-11 may be about 500 packets/second, for example. More specifically, the uniform distributed traffic has a packet rate between 250 to 750 packets/second, for example, in Case 11.

Figure 4D:
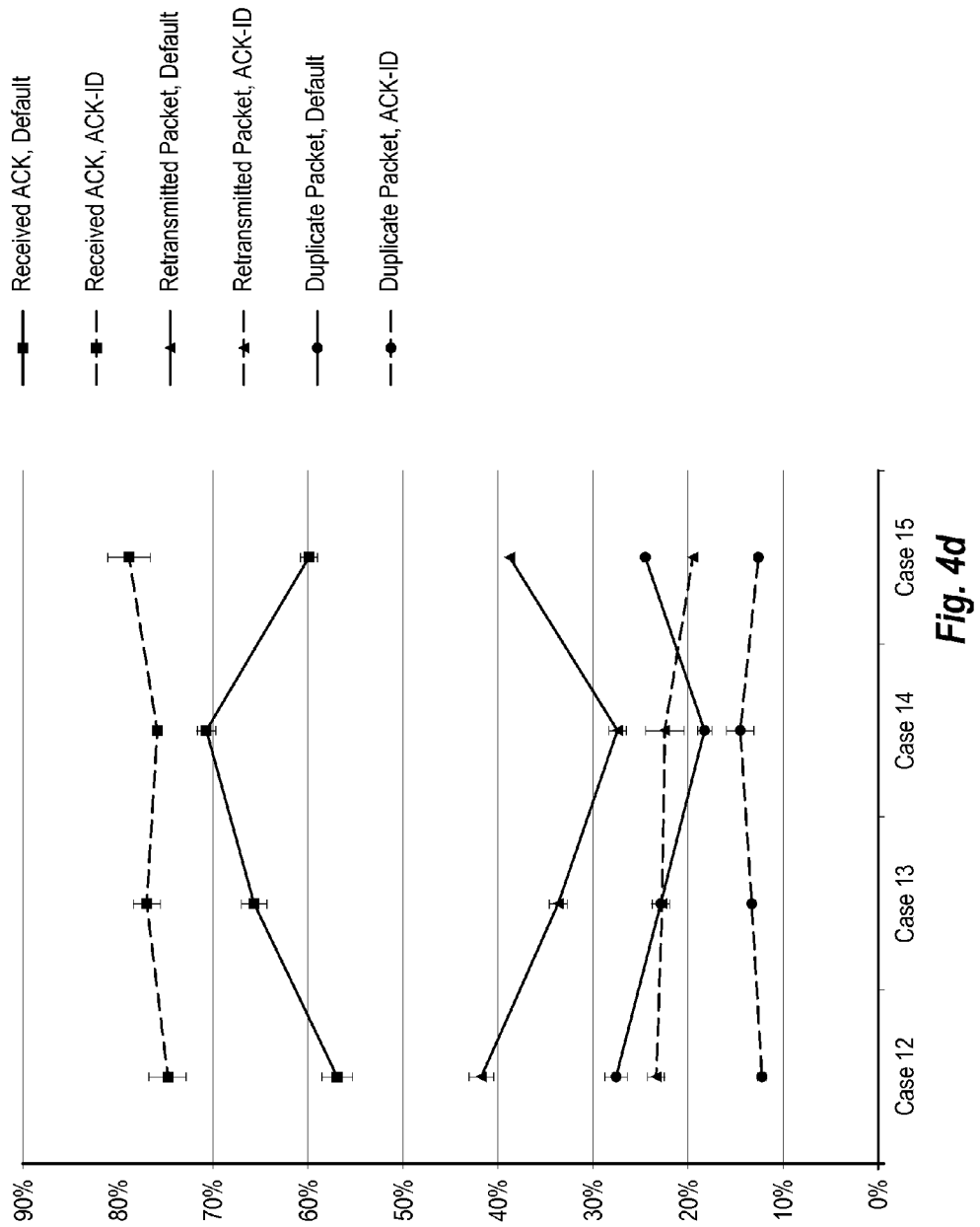

FIG. 4d depicts example results from an example situation in which the UDP traffic includes packets having payload size and IDT at four different random distributions. Specifically, Case 12 includes a Poisson random distribution. Case 13 includes a uniform random distribution. Case 14 includes an exponential random distribution. Case 15 includes a normal random distribution. The Cases 12-15 further include a mean payload size of 1100 bytes and arrival rate of 500 packets/second. For the uniform distribution, the UDP packet generation rate includes example values between 250 and 750 packets/second and an example payload size between 900 to 1300 bytes. Interfering UDP traffic with normal distribution has an expected payload size of 1100 bytes and standard deviation of 200 bytes, for example.

FIG. 4a shows that the ACK-ID module may achieve more significant performance improvements when the interfering traffic has higher packet arrival rates. For example, as depicted in FIG. 4a, an improvement of about 12% in a number of received ACK packets may occur when the interfering traffic is 300 packets/second, for example, and an improvement of about 24% may occur when the interfering traffic is 600 packets/second, for example. From FIG. 4b, it may be concluded that when the interfering traffic has smaller packet sizes, the performance improvements may be less significant. For example, an improvement of about 2.5% in a number of received ACK packets may occur when the payload size of the interfering traffic is 500 bytes, for example, and an improvement of about 10.2% in a number of received ACK packets may occur when the payload size is 1100 bytes, for example. The performance improvement can also be observed in all Cases in which the packet sizes and/or the IDTs of the interfering traffic followed different random distributions, as illustrated in FIGS. 4c and 4d. With a reduced number of lost ACK packets, the number of unnecessary packet retransmissions and received duplicate packets may also be reduced. Additionally, with a reduced number of lost ACK packets, the energy consumption may be reduced. In addition, by reducing packet retransmissions, the ACK-ID module may save channel occupation time spent on packet retransmissions so as to allow more efficient use of the limited bandwidth or support more sensor nodes.

Furthermore, the maxACK-IDTime may be shorter than a time needed for packet retransmission. Because of the reduced time spent for packet retransmissions, the ACK-ID module may better support high ZigBee packet transmission rates with less packet drops due to TXFIFO overflow than systems without ACK-ID.

Figure 5:
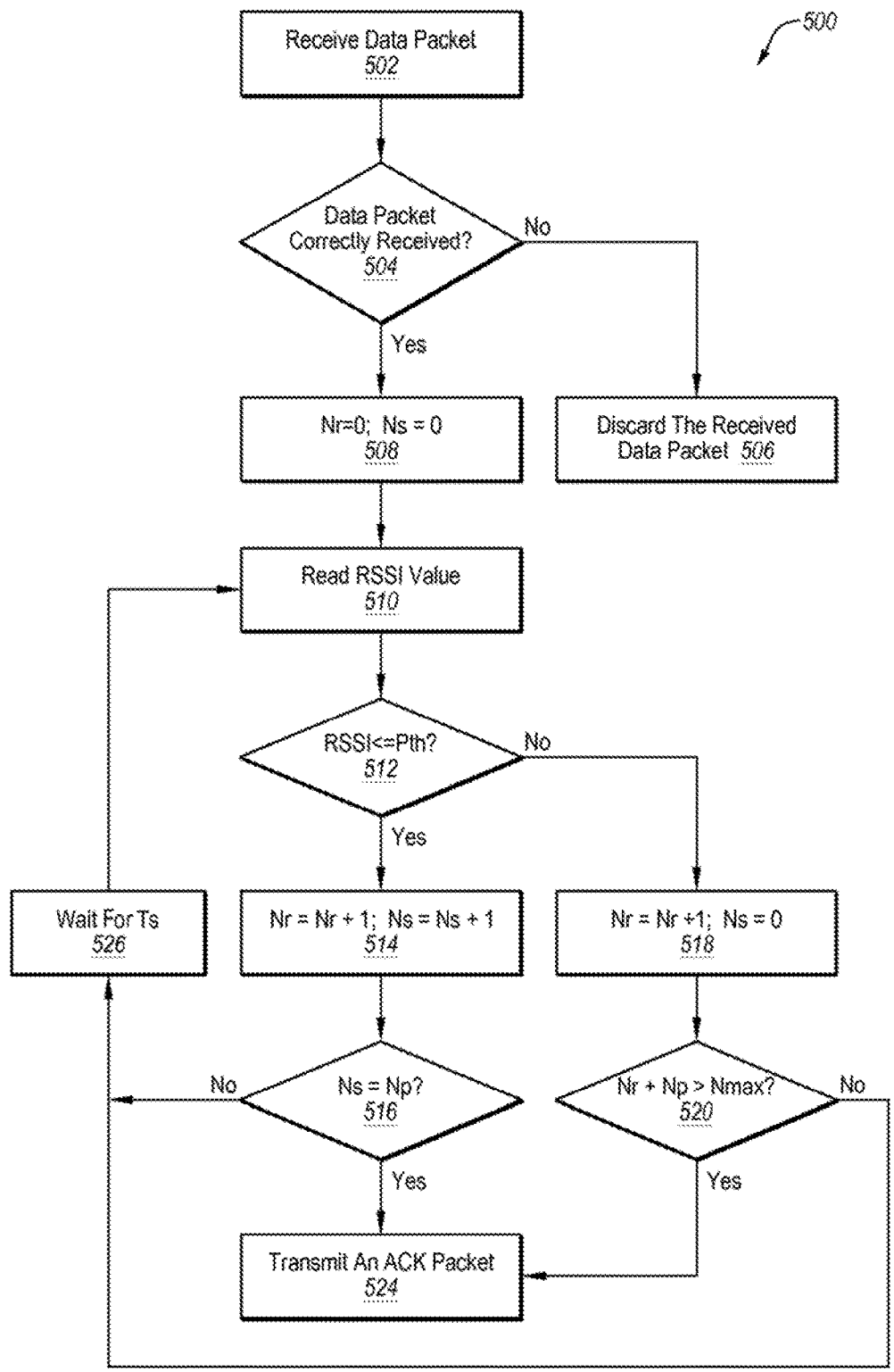
FIG. 5 shows a flow diagram of an example ACK-ID method.
Figure 4C:
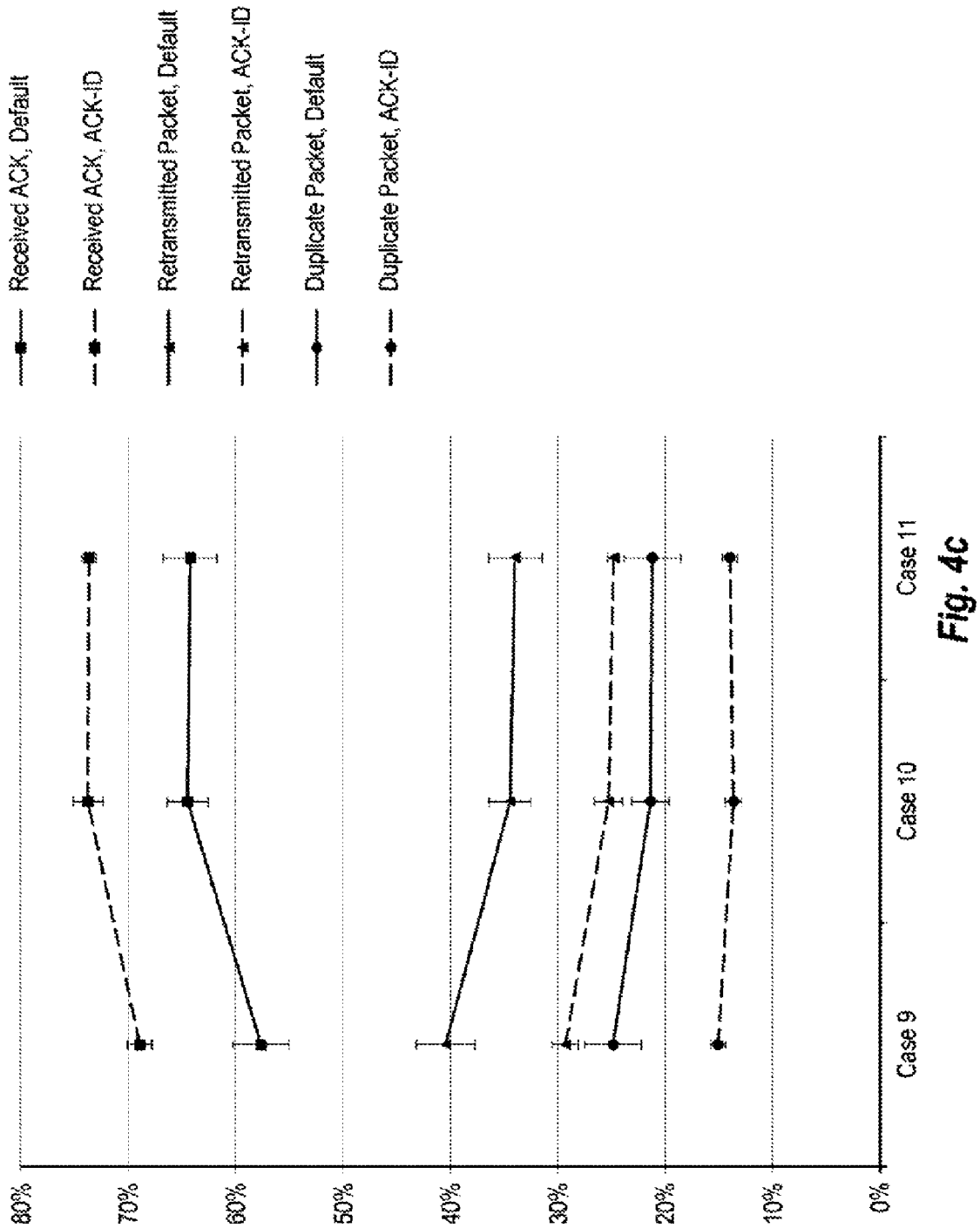

FIG. 5 shows a flow diagram of an example ACK-ID method, arranged in accordance with at least some embodiments described herein. The method 500 may be performed, for example, in the operating environment 100 and/or the ZigBee/Wi-Fi operating environment 300 of FIGS. 1 and 3 and/or in other operating environments and configurations. For example, one or more of the first node 106a, the second node 106b, the first ZigBee mote 306a, and/or the second ZigBee mote 306b may include an ACK-ID module that may be configured to perform the method 500.

The method 500 (including the operations in the various blocks described below) may be performed in some embodiments by the ACK-ID module 112 (of a recipient device) that may be included in a computing device. In some embodiments, the computing device may include or may be communicatively coupled to a non-transitory computer-readable medium that includes computer-readable instructions stored thereon, which in response to execution by a processor, cause the processor to perform the method 500. The ACK-ID module 112 in some embodiments may be implemented by such computer-readable instructions stored on a non-transitory computer-readable medium (such as a memory) and executable by one or more processors (such as a processor at a recipient node/device). Although illustrated as discrete blocks, various blocks may be divided into additional blocks, supplemented with additional blocks, combined into fewer blocks, or eliminated, depending on the particular implementation.

The method 500 may begin at block 502. At block 502 ("Receive Data Packet"), a data packet may be received. At block 504 ("Data Packet Correctly Received?"), a determination may be made whether the data packet is correctly received. When it is determined that the data packet is correctly received ("Yes" at block 504), the method 500 may proceed to block 508. When it is determined that the data packet is incorrectly received ("No" at block 504), the method 500 may proceed to block 506.

At block 506 ("Discard The Received Data Packet"), the received data packet may be discarded in response to the data packet being incorrectly received. At block 508 ("Nr=0; Ns=0"), in response to the data packet being correctly received, the Nr and the Ns may be zeroed. Additionally, in response to the data packet being correctly received, the method 500 may proceed from block 508 to block 510.

At block 510 ("Read RSSI Value"), an RSSI value may be read. At block 512 ("RSSI<=Pth"), it may be determined whether the RSSI value is less than or equal to the Pth. When the RSSI value is less than or equal to the Pth ("Yes" at block 512), the method 500 may proceed to one or more of blocks 514, 516, 524, and 526. When the RSSI value is greater than the Pth, the method 500 may proceed to one or more of blocks 518, 520, 524, and 526.

At block 514 ("Nr=Nr+1; Ns=Ns+1"), the Nr and the Ns may be incremented in response to the RSSI value being less than or equal to the Pth. Additionally, in response to the RSSI value being less than or equal to the Pth, at block 516 ("Ns=Np?"), it may be determined whether the Ns is equal to the Np. At block 524 ("Transmit an ACK Packet"), in response to the Ns being equal to the Np ("Yes" at block 516), an ACK packet may be transmitted. Alternatively, at block 526 ("Wait for Ts"), in response to the Ns not being equal to the Np ("No" at block 516), the method 500 may include waiting for the Ts.

Alternatively, when the RSSI value is greater than the Pth ("No" at block 512), the method 500 may proceed from block 512 to block 518. At block 518 ("Nr=Nr+1; Ns=0"), the Nr may be incremented and the Ns may be zeroed. At block 520 ("Nr+Np>Nmax"), it may be determined whether a sum of the Nr and the Np is greater than the Nmax. At block 524, in response to the sum of the Nr and the Np being greater than the Nmax ("Yes" at block 520), the ACK packet may be transmitted. Alternatively, at block 526, in response to the sum of the Nr and the Np being less than the Nmax ("No" at block 520), the method 500 may include waiting for the Ts.

After waiting for the Ts at block 526, the method 500 may proceed to block 510 in which a successive RSSI value may be read. Transmitting the ACK packet may be based on the successive RSSI value as discussed with reference to one or more of the blocks 514, 516, 518, 520, 524, and 526.

For this and other procedures and methods disclosed herein, the functions or operations performed in the processes and methods may be implemented in differing order. Furthermore, the outlined operations are only provided as examples, and some of the operations may be optional, combined into fewer operations, supplemented with other operations, or expanded into additional operations without detracting from the disclosed embodiments.

FIG. 6 is a block diagram illustrating an example computing device 600 that is arranged for ACK-ID, arranged in accordance with at least some embodiments described herein. The computing device 600 may be used in some embodiments to implement the first node 106a, the second node 106b, the various motes described above, and/or any other device that is capable to provide the features and operations described herein. In a basic configuration 602, the computing device 600 typically includes one or more processors 604 and a system memory 606. A memory bus 608 may be used for communicating between the processor 604 and the system memory 606.

Depending on the desired configuration, the processor 604 may be of any type including, but not limited to, a microprocessor (µP), a microcontroller (µC), a digital signal processor (DSP), or any combination thereof. The processor 604 may include one or more levels of caching, such as a level one cache 610 and a level two cache 612, a processor core 614, and registers 616. The processor core 614 may include an arithmetic logic unit (ALU), a floating point unit (FPU), a digital signal processing core (DSP core), or any combination thereof. An example memory controller 618 may also be used with the processor 604, or in some implementations the memory controller 618 may be an internal part of the processor 604.

Depending on the desired configuration, the system memory 606 may be of any type including, but not limited to, volatile memory (such as RAM), non-volatile memory (such as ROM, flash memory, etc.), or any combination thereof. The system memory 606 may include an operating system 620, one or more applications 622, and program data 624. The application 622 may include an ACK-ID algorithm 626 that is arranged to detect interference during data communication (including being arranged to control the transmission of an ACK packet such as described above), usable, for example, when the computing device 600 is operable as a recipient device to receive a data packet from a transmitting device. The program data 624 may include RSSI data 628, a configurable Pth, and other data that may be useful for interference detection, ACK packet transmission, etc. as is described herein. In some embodiments, the application 622 may be arranged to operate with the program data 624 on the operating system 620 such that interference may be detected based on the configurable settings and/or RSSI data that indicate channel availability. The processor 604 and/or the system memory 606 may be provided on the device with the physical interface or on a remote device to which the device with the physical interface is communicatively coupled. Alternately or additionally, the processor 604 may be included in one or more of the first node 106a and the second node 106b of FIG. 1. The ACK-ID module 112 of one embodiment may be implemented at least in part by the application 622 in cooperation with the program data 624, the processor 604, and/or other elements of the computing device 600.

The computing device 600 may have additional features or functionality, and additional interfaces to facilitate communications between the basic configuration 602 and any required devices and interfaces. For example, a bus/interface controller 630 may be used to facilitate communications between the basic configuration 602 and one or more data storage devices 632 via a storage interface bus 634. The data storage devices 632 may be removable storage devices 636, non-removable storage devices 638, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and non-volatile, removable and non-removable media implemented in any method or technology for storage of information, such as computer-readable instructions, data structures, program modules, or other data.

The system memory 606, the removable storage devices 636, and the non-removable storage devices 638 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (e.g., output devices 642, peripheral interfaces 644, and communication devices 646) to the basic configuration 602 via the bus/interface controller 630. The output devices 642 include a graphics processing unit 648 and an audio processing unit 650, which may be configured to communicate to various external devices such as a display or speakers via one or more A/V ports 652. The peripheral interfaces 644 include a serial interface controller 654 or a parallel interface controller 656, which may be configured to communicate with external devices such as input devices (e.g., keyboard, mouse, pen, voice input device, touch input device, etc.), sensors, or other peripheral devices (e.g., printer, scanner, etc.) via one or more I/O ports 658. The communication devices 646 include a network controller 660, which may be arranged to facilitate communications with one or more other computing devices 662 over a network communication link via one or more communication ports 664.

The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term "computer-readable media" as used herein may include both storage media and communication media.

The computing device 600 may be implemented as a portion of a small-form factor portable (or mobile) electronic device such as a cell phone, a personal data assistant (PDA), a personal media player device, a wireless web-watch device, a personal headset device, an application-specific device, or a hybrid device that include any of the above functions. The computing device 600 may also be implemented as a personal computer including both laptop computer and non-laptop computer configurations.

The present disclosure is not to be limited in terms of the particular embodiments described herein, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of this disclosure. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, various embodiments of the present disclosure have been described herein for purposes of illustration, and various modifications may be made without departing from the scope and spirit of the present disclosure. Accordingly, the various embodiments disclosed herein are not intended to be limiting.

What is claimed is:

1. A method, comprising:
   determining whether a data packet is correctly received; and
   in response to the data packet being correctly received:
      zeroing a reading number (Nr) that indicates a number of received signal strength indication (RSSI) readings;
      zeroing a successive number (Ns) that indicates a number of successive RSSI readings that are below or equal to a clear channel assessment energy detection threshold (Pth);
      reading a RSSI value; and
      based on a relationship between the RSSI value and the Pth, determining whether to transmit an acknowledgement packet,
   wherein a determination of whether to transmit the acknowledgement packet based on the relationship reduces packet loss due to traffic interference.

2. The method of claim 1, further comprising, in response to the data packet being incorrectly received, discarding the received data packet.

3. The method of claim 1, wherein determining whether to transmit the acknowledgement packet includes:
   determining whether the RSSI value is less than or equal to the Pth; and
   in response to the RSSI value being less than or equal to the Pth:
      incrementing the Nr and incrementing the Ns;
      determining whether the Ns is equal to a particular number (Np) that indicates a particular number of successive RSSI readings below or equal to the Pth;
      in response to the Ns being equal to the Np, transmitting the acknowledgement packet; and
      in response to the Ns not being equal to the Np, waiting for a time interval (Ts).

4. The method of claim 3, wherein determining whether to transmit the acknowledgement packet further includes in response to the RSSI value being greater than the Pth:
   incrementing the Nr and zeroing the Ns;
   determining whether a sum of the Nr and the Np is greater than a maximum number (Nmax) that indicates a maximum number of RSSI readings for interference detection;
   in response to the sum of the Nr and the Np being greater than the Nmax, transmitting the acknowledgement packet; and
   in response to the sum of the Nr and the Np being less than the Nmax, waiting for the Ts.

5. The method of claim 4, further comprising after waiting for the Ts, reading a successive RSSI value.

6. The method of claim 4, wherein determining whether the data packet is correctly received, reading the RSSI value, determining whether to transmit the acknowledgement packet, and transmitting the acknowledgement packet occurs within a wait time.

7. The method of claim 6, wherein the wait time includes a summation of a time for the Nmax, a basic time period used by an implemented communication algorithm, a turn-around time for receive-to-transmit, and a duration for octets of the acknowledgement packet.

8. A non-transitory computer-readable medium that includes computer-readable instructions stored thereon, which in response to execution by a processor, cause the processor to perform or cause the processor to control performance of the method of claim 1.

9. A node of a first network, the first network being configurable to operate within a proximity of a second network that communicates traffic that interferes with data communication in the first network, the node comprising:
   a processor; and
   a module operatively coupled to the processor and responsive to the processor to perform acknowledgement communication with interference detection, the module being configured to:
   determine whether a data packet is correctly received; and
   in response to a determination that the data packet is correctly received:
      zero a reading number (Nr) that indicates a number of received signal strength indication (RSSI) readings;
      zero a successive number (Ns) that indicates a number of successive RSSI readings that are below or equal to a clear channel assessment energy detection threshold (Pth);
      read a RSSI value; and
      based on a relationship between the RSSI value and the Pth, determine whether to transmit an acknowledgement packet,
   wherein a determination of whether to transmit the acknowledgement packet based on the relationship reduces packet loss due to traffic interference.

10. The node of claim 9, wherein the module is further configured to, in response to a determination that the data packet is incorrectly received, discard the received data packet.

11. The node of claim 9, wherein to determine whether to transmit the acknowledgement packet, the module is configured to:
   determine whether the RSSI value is less than or equal to the Pth; and
   in response to the RSSI value being less than or equal to the Pth:
      increment the Nr and increment the Ns;
      determine whether the Ns is equal to a particular number (Np) that indicates a particular number of successive RSSI readings below or equal to the Pth;

in response to the Ns being equal to the Np, transmit the acknowledgement packet; and
in response to the Ns not being equal to the Np, wait for a time interval (Ts).

12. The node of claim 11, wherein to determine whether to transmit the acknowledgement packet, the module is further configured to, in response to the RSSI value being greater than the Pth:
increment the Nr and zero the Ns;
determine whether a sum of the Nr and the Np is greater than a maximum number (Nmax) that indicates a maximum number of RSSI readings for interference detection;
in response to the sum of the Nr and the Np being greater than the Nmax, transmit the acknowledgement packet; and
in response to the sum of the Nr and the Np being less than the Nmax, wait for the Ts.

13. The node of claim 11, wherein the module is further configured to, after the wait for the Ts, read a successive RSSI value.

14. The node of claim 9, wherein the node includes a ZigBee mote.

15. The node of claim 9, wherein the first network and the second network communicate using different communication standards.

16. The node of claim 9, wherein the first network and the second network communicate using a single common communication standard.

17. The node of claim 9, wherein the second network includes a wireless local area network (WLAN), and the first network includes a ZigBee network.

18. A node of a first network, wherein the first network is configurable to operate within a proximity of a second network that communicates traffic that interferes with data communication in the first network, the node comprising:
a processor; and
a module operatively coupled to the processor and responsive to the processor to perform acknowledgement communication with interference detection, the module being configured to:
determine whether a data packet is correctly received; and
in response to a determination that the data packet is correctly received:
read a received signal strength indication (RSSI) value; and
based on the RSSI value, determine whether to transmit an acknowledgement (ACK) packet,
wherein a determination of whether to transmit the ACK packet based on the RSSI value reduces packet loss due to traffic interference, and
wherein the module is configured to determine whether the data packet is correctly received, to read the RSSI value, to determine whether to transmit the ACK packet, and to transmit the ACK packet within a wait time.

19. The node of claim 18, wherein the wait time includes a summation of a time for a maximum number (Nmax) that indicates a maximum number of RSSI readings for interference detection, a basic time period used by an implemented communication algorithm, a turn-around time for receive-to-transmit, and a duration for octets of the ACK packet.

20. A method, comprising:
determining whether a data packet is correctly received;
in response to the data packet being incorrectly received, discarding the received data packet;
in response to the data packet being correctly received:
zeroing a reading number (Nr) that indicates a number of received signal strength indication (RSSI) readings;
zeroing a successive number (Ns) that indicates a number of successive RSSI readings that are below or equal to a clear channel assessment energy detection threshold (Pth);
reading a RSSI value;
determining whether the RSSI value is less than or equal to the Pth;
in response to the RSSI value being less than or equal to the Pth:
incrementing the Nr and incrementing the Ns;
determining whether the Ns is equal to a particular number (Np) that indicates a particular number of successive RSSI readings below or equal to the Pth;
in response to the Ns being equal to the Np, transmitting an acknowledgement packet; and
in response to the Ns being not equal to the Np, waiting for a time interval (Ts); and
in response to the RSSI value being greater than the Pth:
incrementing the Nr and zeroing the Ns;
determining whether a sum of the Nr and the Np is greater than a maximum number (Nmax) that indicates a maximum number of RSSI readings for interference detection;
in response to the sum of the Nr and the Np being greater than the Nmax, transmitting the acknowledgement packet; and
in response to the sum of the Nr and the Np being less than the Nmax, waiting for the Ts,
wherein transmission of the acknowledgement packet based on a relationship between the Ns and the Np, transmission of the acknowledgement packet based on a relationship between the Nmax and the sum of the Nr and the Np, or waiting for the Ts reduces packet loss due to traffic interference.

21. The method of claim 20, further comprising, after waiting for the Ts, reading a successive RSSI value.

22. The method of claim 21, further comprising:
determining whether the successive RSSI value is less than or equal to the Pth;
in response to the successive RSSI value being less than or equal to the Pth:
incrementing the Nr and incrementing the Ns;
determining whether the Ns is equal to the Np;
in response to the Ns being equal to the Np, transmitting the acknowledgement packet; and
in response to the Ns being not equal to the Np, waiting for the Ts; and
in response to the successive RSSI value being greater than the Pth:
incrementing the Nr and zeroing the Ns;
determining whether the sum of the Nr and the Np is greater than the Nmax;
in response to the sum of the Nr and the Np being greater than the Nmax, transmitting the acknowledgement packet; and
in response to the sum of the Nr and the Np being less than the Nmax, waiting for the Ts.

23. The method of claim 20, wherein one or more of determining whether the data packet is correctly received, zeroing the Nr and the Ns, reading the RSSI value, determining whether the RSSI value is less than or equal to the Pth, incrementing the Nr, and incrementing the Ns, determining whether the Ns is equal to the Np, transmitting the acknowledgement packet, waiting for the Ts, incrementing the Nr, and zeroing the Ns, determining whether the sum of the Nr and the Np is greater than the Nmax, transmitting the acknowledgement packet, and waiting for the Ts occurs within a wait time to receive the acknowledgement packet.

24. A non-transitory computer-readable medium that includes computer-readable instructions stored thereon, which in response to execution by a processor, cause the processor to perform or cause the processor to control performance of the method of claim 20.

25. A system, comprising:
a first node including a first processor and a first module operatively coupled to the first processor and responsive to the first processor to perform:
  read a received signal strength indication (RSSI) value;
  determine whether the RSSI value is less than or equal to a clear channel assessment energy detection threshold (Pth);
  in response to the RSSI value being less than or equal to the Pth:
    increment a reading number (Nr) that indicates a number of RSSI readings;
    increment a successive number (Ns) that indicates a number of successive RSSI readings that are below or equal to the Pth;
    determine whether the Ns is equal to a particular number (Np) that indicates a particular number of successive RSSI readings below or equal to the Pth;
    in response to the Ns being equal to the Np, transmit an acknowledgement packet; and
    in response to the Ns not being equal to the Np, wait for a time interval (Ts); and
  in response to the RSSI value being greater than the Pth:
    increment the Nr and zero the Ns;
    determine whether a sum of the Nr and the Np is greater than a maximum number (Nmax) that indicates a maximum number of RSSI readings for interference detection;
    in response to the sum of the Nr and the Np being greater than the Nmax, transmit the acknowledgement packet; and
    in response to the sum of the Nr and the Np being less than the Nmax, wait for the Ts,
  wherein transmission of the acknowledgement packet based on a relationship between the Ns and the Np, transmission of the acknowledgement packet based on a relationship between the Nmax and the sum of the Nr and the Np, or the wait for the Ts reduces packet loss due to traffic interference.

26. The system of claim 25, further comprising a second node including a second processor and a second module operatively coupled to the second processor and responsive to the second processor to set a wait time for reception of the acknowledgement packet.

27. The system of claim 26, wherein:
the first node includes a ZigBee mote; and
the second node includes a ZigBee mote.

28. The system of claim 26, wherein to set the wait time, the second module is configured to sum an RSSI wait time for a maximum number of RSSI readings for interference detection, a basic time period used by an implemented communication algorithm, a turn-around time for receive-to-transmit, and a duration for octets of the acknowledgement packet.

* * * * *

UNITED STATES PATENT AND TRADEMARK OFFICE
CERTIFICATE OF CORRECTION

PATENT NO. : 9,723,490 B2
APPLICATION NO. : 14/335580
DATED : August 1, 2017
INVENTOR(S) : Wang et al.

Page 1 of 2

It is certified that error appears in the above-identified patent and that said Letters Patent is hereby corrected as shown below:

Please replace Sheet 7 of 10, Fig. 4c with attached Sheet 7 of 10, Fig. 4c.

In Column 1, Lines 5-6, delete "CROSS REFERENCE TO RELATED APPLICATION APPLICATIONS" and insert -- CROSS-REFERENCE TO RELATED APPLICATION --, therefor.

In Column 7, Line 41, delete "drive(HDD)," and insert -- drive (HDD), --, therefor.

In Column 8, Line 26, delete "microseconds (p)," and insert -- microseconds (µs), --, therefor.

In Column 16, Line 17, delete "implementations the" and insert -- implementations, the --, therefor.

Signed and Sealed this
Twenty-third Day of January, 2018

Joseph Matal
*Performing the Functions and Duties of the
Under Secretary of Commerce for Intellectual Property and
Director of the United States Patent and Trademark Office*